(12) United States Patent
Wen et al.

(10) Patent No.: US 12,294,742 B2
(45) Date of Patent: May 6, 2025

(54) VIDEO ENCODING/DECODING METHOD, AND CORRESPONDING DEVICES

(71) Applicant: SAMSUNG ELECTRONICS CO., LTD., Suwon-si (KR)

(72) Inventors: Liang Wen, Beijing (CN); Weijing Shi, Beijing (CN); Lizhong Wang, Beijing (CN); Ying Zhang, Beijing (CN); Yinji Piao, Beijing (CN); Xiaoyan Lou, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 18/214,197

(22) Filed: Jun. 26, 2023

(65) Prior Publication Data
US 2023/0412848 A1    Dec. 21, 2023

Related U.S. Application Data

(63) Continuation of application No. PCT/KR2023/008291, filed on Jun. 15, 2023.

(30) Foreign Application Priority Data

Jun. 16, 2022  (CN) .......................... 202210687108.7
Apr. 27, 2023  (CN) .......................... 202310477747.5

(51) Int. Cl.
*H04N 19/80*    (2014.01)
*H04N 19/124*   (2014.01)
(Continued)

(52) U.S. Cl.
CPC ........... *H04N 19/80* (2014.11); *H04N 19/124* (2014.11); *H04N 19/137* (2014.11);
(Continued)

(58) Field of Classification Search
CPC ...... H04N 19/80; H04N 19/59; H04N 19/124; H04N 19/126; H04N 19/85; H04N 19/86
See application file for complete search history.

(56) References Cited

U.S. PATENT DOCUMENTS 11,128,873 B2    9/2021   Katayama
11,375,227 B2    6/2022   Zhang
(Continued)

FOREIGN PATENT DOCUMENTS

CN    112995670 A    6/2021
CN    113709483 A    11/2021
(Continued)

OTHER PUBLICATIONS

Y. Kidani, K. Kawamura, K. Unno, & S. Naito, "Blocksize-QP Dependent Intra Interpolation Filters", 2019 IEEE Int'l Conf. on Image Processing 4125-4129 (Sep. 2019) (Year: 2019).*
(Continued)

*Primary Examiner* — David N Werner
(74) *Attorney, Agent, or Firm* — Sughrue Mion, PLLC

(57) ABSTRACT

A video encoding method includes: based on at least one of first distortion aware information about a current encoding unit and second distortion aware information about a corresponding reference encoding unit, determining a first predicted value of the current encoding unit using at least one interpolation filter, wherein the at least one type of interpolation filter may include an artificial intelligence (AI) interpolation filter; and encoding the current encoding unit based on the first predicted value of the current encoding unit.

20 Claims, 13 Drawing Sheets

(51) Int. Cl.
*H04N 19/137* (2014.01)
*H04N 19/182* (2014.01)
*H04N 19/46* (2014.01)
*H04N 19/85* (2014.01)
*H04N 19/86* (2014.01)

(52) U.S. Cl.
CPC ........... *H04N 19/182* (2014.11); *H04N 19/46* (2014.11); *H04N 19/85* (2014.11); *H04N 19/86* (2014.11)

(56) References Cited

U.S. PATENT DOCUMENTS

| | | | | |
|---|---|---|---|---|
| 2010/0002770 | A1* | 1/2010 | Motta | H04N 19/19 |
| | | | | 375/E7.076 |
| 2010/0074323 | A1* | 3/2010 | Fu | H04N 19/117 |
| | | | | 375/240.02 |
| 2016/0212448 | A1* | 7/2016 | Wang | H04N 19/124 |
| 2018/0220148 | A1* | 8/2018 | Ikonin | H04N 19/523 |
| 2019/0141349 | A1 | 5/2019 | Oh et al. | |
| 2019/0145192 | A1* | 5/2019 | Rios | E21B 15/003 |
| | | | | 414/22.61 |
| 2020/0382793 | A1* | 12/2020 | Gao | H04N 19/147 |
| 2020/0382794 | A1 | 12/2020 | Katayama | |
| 2021/0176492 | A1* | 6/2021 | Kim | H04N 19/176 |
| 2021/0185314 | A1 | 6/2021 | Kidani et al. | |
| 2022/0141460 | A1 | 5/2022 | Nasrallah et al. | |

FOREIGN PATENT DOCUMENTS

| | | | | |
|---|---|---|---|---|
| CN | 114598877 A | 6/2022 | | |
| KR | 10-2105766 B1 | 4/2020 | | |
| WO | 2022/237168 A1 | 11/2022 | | |
| WO | WO-2023287966 A1 * | 1/2023 | ........... | G06T 3/4007 |
| WO | WO-2023014478 A1 * | 2/2023 | ........... | H04N 19/117 |

OTHER PUBLICATIONS

International Search Report and Written Opinion (PCT/ISA/220, PCT/ISA/210, and PCT/ISA/237) issued Sep. 19, 2023 by the International Searching Authority in International Application No. PCT/KR2023/008291.

* cited by examiner

FIG. 1

VIDEO ENCODING/DECODING METHOD, AND CORRESPONDING DEVICES

CROSS-REFERENCE TO RELATED APPLICATIONS

This application is a continuation of International Application No. PCT/KR2023/008291, filed on Jun. 15, 2023, in the Korean Intellectual Property Receiving Office, which is based on and claims priority to Chinese Patent Application No. 202210687108.7, filed on Jun. 16, 2022, and Chinese Patent Application No. 202310477747.5, filed on Apr. 27, 2023, in the China National Intellectual Property Administration, the disclosures of which are incorporated by reference herein in their entireties.

BACKGROUND

1. Field

The disclosure relates to video encoding/decoding, and mare particularly to a video encoding/decoding method and corresponding devices.

2. Description of Related Art

In some implementations of video encoding/decoding, each frame in a video sequence may be divided into a plurality of encoding units, so that each encoding unit may be encoded and decoded. An encoder may perform intra-frame prediction or inter-frame prediction on each encoding unit to obtain a predicted value, and then write the coefficient obtained after transformation and quantization of the difference between the predicted value and the original value, as well as other encoding information, into a code stream after entropy encoding. The decoder may obtain the encoding information and coefficient information of the current block to be decoded from the code stream, obtain the predicted value according to the encoding information, perform inverse quantization and inverse transformation on the coefficient to obtain the difference, and add the predicted value and the difference to obtain a reconstruction value of each encoding unit.

In the inter-frame prediction process, by using the spatial and temporal correlations between the current encoding unit and neighboring blocks, the motion vector predicted value of the current encoding unit may be obtained according to the neighboring coded or decoded blocks; and then, the position indicated by the motion vector predicted value may be derived from the reference image and used as a search center, and the best-matched block of the current encoding unit may be found in a certain search range. Because the motion vector uses ¼ precision as a basic unit, the position of each sample point in the best-matched block may be the position of an integer-pixel sample point or the position of a sub-pixel sample point, where the value of the position (e.g., ½ and ¼ precision position) of the sub-pixel sample point may be obtained by interpolating the values of the positions of the surrounding integer-pixel sample points. The difference between the position of the best-matched block and the position of the search center may be a motion vector difference, and the value of each sample point in the best-matched block may be the predicted value of each sample point in the current encoding unit.

According, there may be a problem of low inter-frame prediction accuracy.

SUMMARY

Provided is a video encoding method in which a predicted value of a current encoding unit is obtained by using an interpolation filter including an AI interpolation filter, distortion aware information of a current encoding unit and/or a corresponding reference encoding unit is introduced in the interpolation process, and the current encoding unit is coded based on the determined predicted value. The distortion aware information may be considered, so that the accuracy of inter-frame prediction may be improved, and the encoding/decoding efficiency may be improved.

In accordance with an aspect of the disclosure, a video encoding method includes: based on at least one of first distortion aware information about a current encoding unit and second distortion aware information about a corresponding reference encoding unit, determining a first predicted value of the current encoding unit using at least one interpolation filter, wherein the at least one type of interpolation filter may include an artificial intelligence (AI) interpolation filter; and encoding the current encoding unit based on the first predicted value of the current encoding unit.

The first distortion aware information may include at least one of a quantization parameter of the current encoding unit and a quantization parameter difference between the current encoding unit and the corresponding reference encoding unit, and the second distortion aware information may include at least one of a quantization parameter of the corresponding reference encoding unit, and the quantization parameter difference.

The quantization parameter of the current encoding unit may be determined based on the quantization parameter of the corresponding reference encoding unit and the quantization parameter difference, and wherein the quantization parameter of the corresponding reference encoding unit may be determined based on the quantization parameter of the current encoding unit and the quantization parameter difference.

The AI interpolation filter may include at least one convolution unit, the at least one convolution unit may include at least one convolution layer and at least one nonlinear activation layer, and the at least one nonlinear activation layer may be configured to, based on the first distortion aware information, process a convolution result output by a cascaded convolution layer.

The at least one nonlinear activation layer may be configured to process the convolution result output by the cascaded convolution layer based on an activation parameter determined based on the first distortion aware information.

Based on at least two types of interpolation filters being used to determine the first predicted value of the current encoding unit, the method further may include: writing identification information which indicates an interpolation filter corresponding to the first predicted value into a code stream.

The writing the identification information may include: writing the identification information into the code stream using a predetermined coding unit (CU)-level flag bit.

The determining the first predicted value of the current encoding unit may include: based on the at least one of the first distortion aware information and the second distortion aware information, determining a second predicted value corresponding to each sub-pixel position of the current encoding unit using the at least one type of interpolation filter; and determining the first predicted value of the current encoding unit based on the second predicted value.

The determining the second predicted value may include: obtaining a motion vector (MV) corresponding to an integer-pixel position of the current encoding unit; and determining, based on a reference encoding unit corresponding to the MV, the second predicted value using the at least one type of interpolation filter.

The determining the second predicted value of the current encoding unit further may include: based on at least one of a quantization parameter of the current encoding unit, a quantization parameter of the corresponding reference encoding unit, or a quantization parameter difference between the current encoding unit and the corresponding reference encoding unit, obtaining the second predicted value using the AI interpolation filter.

The obtaining the second predicted value using the AI interpolation filter may include: expanding the reference encoding unit to a predetermined size to obtain a corresponding input matrix; inputting, into at least one cascaded convolution unit of the AI interpolation filter, the input matrix and at least one of: the quantization parameter of the current encoding unit, the quantization parameter of the corresponding reference encoding unit, and the quantization parameter difference; performing a convolution operation using a convolution layer of the convolution unit; and processing the convolution result of the convolution layer using a nonlinear activation layer of the convolution unit to obtain a corresponding second predicted value which corresponds to a sub-pixel position of the current encoding unit.

The determining the first predicted value of the current encoding unit further may include: obtaining a rate distortion cost based on each second predicted value; and determining the first predicted value of the current encoding unit based on each rate distortion cost.

In accordance with an aspect of the disclosure, a video decoding method includes based on received code stream, determining a reference decoding unit corresponding to a current decoding unit; and based on at least one of first distortion aware information about the current decoding unit and second distortion aware information about the corresponding reference decoding unit, decoding the current decoding unit using an artificial intelligence (AI) interpolation filter.

The method may further include obtaining, from the code stream, identification information which indicates an interpolation filter corresponding to the current decoding unit; and based on the identification information, determining to use the AI interpolation filter to decode the current decoding unit.

The first distortion aware information may include at least one of: a quantization parameter of the current decoding unit, and a quantization parameter difference between the current decoding unit and the corresponding reference decoding unit, and the second distortion aware information may include at least one of: a quantization parameter of the reference decoding unit, and the quantization parameter difference.

The quantization parameter of the current decoding unit may be determined based on the quantization parameter of the reference decoding unit and the quantization parameter difference, and the quantization parameter of the reference decoding unit may be determined based on the quantization parameter of the current decoding unit and the quantization parameter difference.

The AI interpolation filter may include at least one convolution unit, the at least one convolution unit may include at least one convolution layer and at least one nonlinear activation layer and the at least one nonlinear activation layer may be configured to process a convolution result output by a cascaded convolution layer based on first the distortion aware information of the current decoding unit.

The at least one nonlinear activation layer may be configured to, using an activation parameter determined based on the distortion aware information of the current decoding unit, process the convolution result output by the cascaded convolution layer.

The decoding may include: based on the at least one of the first distortion aware information and the second distortion aware information, and the motion vector precision information obtained from the code stream, obtaining a predicted value of the current decoding unit by using the AI interpolation filter.

In accordance with an aspect of the disclosure, a video decoding method includes obtaining, from a code stream, identification information which indicates an interpolation filter corresponding to a current decoding unit; and decoding a current decoding unit using the interpolation filter indicated by the identification information.

Based on the interpolation filter being an AI interpolation filter, the decoding may include: based on at least one of first distortion aware information about the current decoding unit and second distortion aware information about the corresponding reference decoding unit, decoding the current decoding unit using the AI interpolation filter.

In accordance with an aspect of the disclosure, an encoding device, including a memory configured to store instructions; and a processor configured to execute the instructions to: based on at least one of first distortion aware information about a current encoding unit and second distortion aware information about a corresponding reference encoding unit, determine a first predicted value of the current encoding unit using at least one interpolation filter, wherein the at least one type of interpolation filter may include an artificial intelligence (AI) interpolation filter; and encode the current encoding unit based on the first predicted value of the current encoding unit.

In accordance with an aspect of the disclosure, a decoding device includes a memory configured to store instructions; and a processor configured to execute the instructions to: based on received code stream, determine a reference decoding unit corresponding to a current decoding unit; and based on at least one of first distortion aware information about the current decoding unit and second distortion aware information about the corresponding reference decoding unit, decode the current decoding unit using an artificial intelligence (AI) interpolation filter.

In accordance with an aspect of the disclosure, a non-transitory computer-readable storage medium has computer instructions stored thereon which, when executed by at least one processor, cause the at least one processor to: based on received code stream, determine a reference decoding unit corresponding to a current decoding unit; and based on at least one of first distortion aware information about the current decoding unit and second distortion aware information about the corresponding reference decoding unit, decode the current decoding unit using an artificial intelligence (AI) interpolation filter.

BRIEF DESCRIPTION OF THE DRAWINGS

In order to explain the technical solutions in the embodiments of the present disclosure more clearly, the drawings to be used in the description of the embodiments of the present disclosure will be briefly illustrated below.

FIG. 1 is a schematic diagram of the positions of integer-pixel sample points, ½ pixel sample points and ¼ pixel sample points in an example according to an embodiment of the present disclosure;

DETAILED DESCRIPTION

Figure 2:
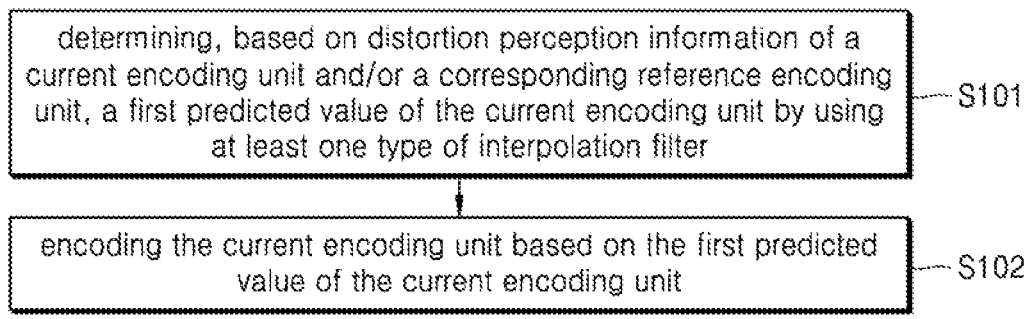
FIG. 2 is a flowchart of a video encoding method according to an embodiment of the present disclosure.

The following description with reference to the accompanying drawings is provided to assist in a comprehensive understanding of various embodiments of the present disclosure as defined by the claims and their equivalents. Various specific details are provided to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

At least some functions in the apparatus or electronic device provided in the embodiments of the present disclosure may be implemented by an artificial intelligence (AI) model. For example, at least one of a plurality of modules of the apparatus or electronic device may be implemented by an AI model. AI-related functions may be performed by at least one of non-volatile memories, volatile memories, and processors.

A processor may include one or more processors. In this case, the one or more processors may be general-purpose processors such as central processing units (CPUs), application processors (APs), etc., or pure graphics processing units such as graphics processing units (GPUs), visual processing Units (VPUs), and/or AI-specific processors such as neural processing units (NPUs).

The one or more processors control the processing of input data according to predefined operating rules or AI models stored in non-volatile memories and the volatile memories. The predefined operating rules or AI models are provided by training or learning.

Here, providing or obtaining by training or learning may refer to obtaining predefined operating rules or AI models having desired characteristics by applying learning algorithms to multiple pieces of learning data. For example, predefined operating rules or AI models configured to perform desired features (or purposes) may be obtained by training a basic AI model with multiple pieces of training data by training algorithms. This learning may be performed in the apparatus or electronic device itself in which the AI is deployed according to an embodiment, and/or may be implemented by a separate server/system.

The AI model may contain multiple neural network layers. Each layer has multiple weight values. Each layer performs neural network calculation by calculation between the input data of this layer (e.g., the calculation result of the previous layer and/or the input data of the AI model) and the multiple weight values of the current layer. Examples of the neural network include, but are not limited to convolutional neural network (CNN), deep neural network (DNN), recurrent neural network (RNN), restricted Boltzmann machine (RBM), deep belief network (DBN), bidirectional recurrent deep neural network (BRDNN), generative adversarial network (GAN) and deep Q network.

A learning algorithm is a method of training a predetermined target apparatus (e.g., a robot) using multiple pieces of learning data to cause, allow or control the target apparatus to make determinations or predictions. Examples of such learning algorithms include, but are not limited to, supervised learning, unsupervised learning, semi-supervised learning, or reinforcement learning.

Embodiments of the present disclosure may relate to one or more of technical fields such as speech, language, image, video, and data intelligence.

In an embodiment, in the speech or language field, in accordance with the present disclosure, in the method executed by an electronic device, a method for recognizing a user's speech and interpreting the user's intention can receive a speech signal as an analog signal via a speech signal acquisition device (e.g., a microphone) and uses an automatic speech recognition (ASR) model to convert the speech into computer-readable text. The user's intention may be obtained by using the text interpreted and converted through a natural language understanding (NLU) model. The ASR model or the NLU model may be an AI model. The AI model may be processed by an AI-specific processor designed in the hardware structure specified for processing the AI model. The AI model may be obtained by training. Language understanding may be a technology for recognizing and applying/processing human language/text, for example, including natural language processing, machine translation, dialogue system, question and answer, or speech recognition/synthesis.

In an embodiment, in the image or video field, in accordance with the present disclosure, in the method executed by an electronic device, a method for object recognition can obtain the output data for recognizing an image or image features in the image by using image data as input data of an AI model. The AI model may be obtained by training. Embodiments of the present disclosure may relate to the visual understanding field of the AI technology. Visual understanding is a technology for recognizing and processing objects like human vision, including, for example, object recognition, object tracking, image retrieval, human recognition, scene recognition, 3D reconstruction/positioning, or image enhancement.

In an embodiment, in the data intelligent processing field, in accordance with the present disclosure, in the method executed by an electronic device, a method for inferring or predicting an object type can recommend/execute type recognition results by using feature data through an AI model. The processor of the electronic device may preprocess data to convert the data into a form suitable for use as an input to the AI model. The AI model may be obtained by training. Inference prediction is a technology for performing logic inference and prediction by using the determined information, including, for example, knowledge-based inference, optimized prediction, preference-based planning, or recommendation.

Figure 1:
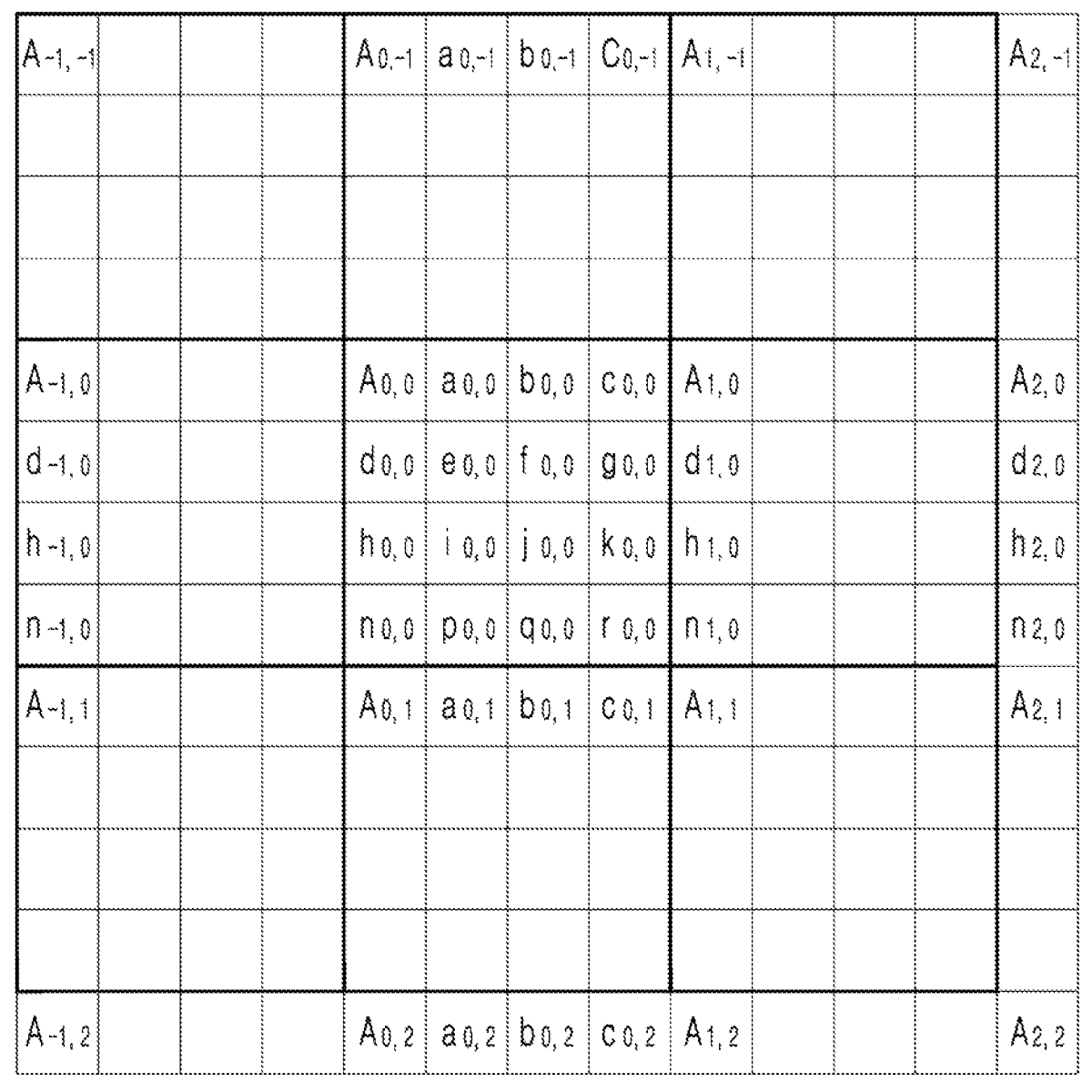

In related art implementations, for a same sub-pixel position, a same set of filter coefficients is used for interpolation calculation. As shown in FIG. 1, the predicted values of the sample positions a0,0, b0,0, and c0,0 are obtained by filtering eight integer values nearest the interpolation point in the horizontal direction. The predicted values are obtained according to Equation 1 through Equation 3 below:

$$a0,0=\text{Clip1}((-A-3,0+4*A-2,0-10*A-1,0+57*A0,0+19*A1,0-7*A2,0+3*A3,0-A4,0+32)\gg 6) \quad \text{Equation 1}$$

$$b0,0=\text{Clip1}((-A-3,0+4*A-2,0-11*A-1,0+40*A0,0+40*A1,0-11*A2,0+4*A3,0-A4,0+32)\gg 6) \quad \text{Equation 2}$$

$$c0,0=\text{Clip1}((-A-3,0+3*A-2,0-7*A-1,0+19*A0,0+57*A1,0-10*A2,0+4*A3,0-A4,0+32)\gg 6 \quad \text{Equation 3}$$

The predicted values of the sample positions d0,0, h0,0, and n0,0 are obtained by filtering eight integer values nearest the interpolation point in the vertical direction. The predicted values are obtained according to Equation 4 to Equation 6 below:

$$d0,0=\text{Clip1}((-A0,-3+4*A0,-2-10*A0,-1+57*A0,0+19*A0,1-7*A0,2+3*A0,3-A0,4+32)\gg 6) \quad \text{Equation 4}$$

$$h0,0=\text{Clip1}((-A0,-3+4*A0,-2-11*A0,-1+40*A0,0+40*A0,1-11*A0,2+4*A0,3-A0,4+32)\gg 6) \quad \text{Equation 5}$$

$$n0,0=\text{Clip1}((-A0,-3+3*A0,-2-7*A0,-1+19*A0,0+57*A0,1-10*A0,2+4*A0,3-A0,4+32)\gg 6) \quad \text{Equation 6}$$

The predicted values of the sample positions e0,0, i0,0, p0,0, f0,0, j0,0, q0,0, g0,0, k0,0 and r0,0 are obtained according to Equation 7 to Equation 15 below:

$$e0,0=\text{Clip1}((-a'0,-3+4*a'0,-2-10*a'0,-1+57*a'0,0+19*a'0,1-7*a'0,2+3*a'0,3-a'0,4+(1\ll 19-\text{BitDepth}))\gg (20-\text{BitDepth})) \quad \text{Equation 7}$$

$$i0,0=\text{Clip1}((-a'0,-3+4*a'0,-2-11*a'0,-1+40*a'0,0+40*a'0,1-11*a'0,2+4*a'0,3-a'0,4+(1\ll 19-\text{BitDepth}))\gg (20-\text{BitDepth})) \quad \text{Equation 8}$$

$$p0,0=\text{Clip1}((-a'0,-3+3*a'0,-2-7*a'0,-1+19*a'0,0+57*a'0,1-10*a'0,2+4*a'0,3-a'0,4+(1\ll 19-\text{BitDepth}))\gg (20-\text{BitDepth})) \quad \text{Equation 9}$$

$$f0,0=\text{Clip1}((-b'0,-3+4*b'0,-2-10*b'0,-1+57*b'0,0+19*b'0,1-7*b'0,2+3*b'0,3-b'0,4+(1\ll 19-\text{BitDepth}))\gg (20-\text{BitDepth})) \quad \text{Equation 10}$$

$$j0,0=\text{Clip1}((-b'0,-3+4*b'0,-2-11*b'0,-1+40*b'0,0+40*b'0,1-11*b'0,2+4*b'0,3-b'0,4+(1\ll 19-\text{BitDepth}))\gg (20-\text{BitDepth})) \quad \text{Equation 11}$$

$$q0,0=\text{Clip1}((-b'0,-3+3*b'0,-2-7*b'0,-1+19*b'0,0+57*b'0,1-10*b'0,2+4*b'0,3-b'0,4+(1\ll 19-\text{BitDepth}))\gg (20-\text{BitDepth})) \quad \text{Equation 12}$$

$$g0,0=\text{Clip1}((-c'0,-3+4*c'0,-2-10*c'0,-1+57*c'0,0+19*c'0,1-7*c'0,2+3*c'0,3-c'0,4+(1\ll 19-\text{BitDepth}))\gg (20-\text{BitDepth})) \quad \text{Equation 13}$$

$$k0,0=\text{Clip1}((-c'0,-3+4*c'0,-2-11*c'0,-1+40*c'0,0+40*c'0,1-11*c'0,2+4*c'0,3-c'0,4+(1\ll 19-\text{BitDepth}))\gg (20-\text{BitDepth})) \quad \text{Equation 14}$$

$$r0,0=\text{Clip1}((-c'0,-3+3*c'0,-2-7*c'0,-1+19*c'0,0+57*c'0,1-10*c'0,2+4*c'0,3-c'0,4+(1\ll 19-\text{BitDepth}))\gg (20-\text{BitDepth})) \quad \text{Equation 15}$$

In Equation 7 to Equation 15, the term a'0,i, the term b'0,i, and the term c'0,i may be obtained according to Equation 16 to Equation 18 below:

$$a'0,i=(-A-3,i+4*A-2,i-10*A-1,i+57*A0,i+19*A1,i-7*A2,i+3*A3,i-A4,i+((1\ll \text{BitDepth}-8)\gg 1))\gg (\text{BitDepth}-8) \quad \text{Equation 16}$$

$$b'0,i=(-A-3,i+4*A-2,i-11*A-1,i+40*A0,i+40*A1,i-11*A2,i+4*A3,i-A4,i+<<\text{BitDepth}-8)\gg 1))\gg (\text{BitDepth}-8) \quad \text{Equation 17}$$

$$c'0,i=(-A-3,i+3*A-2,i-7*A-1,i+19*A0,i+57*A1,i-10*A2,i+4*A3,i-A4,i+<<BitDepth-8)>>1))>>(BitDepth-8)$$

Equation 18

In the above Equations, clip ( ) denotes that a clip operation is performed on a part of the array in the bracket that is less than or greater than a certain value, and the clipped part is equal to a fixed value; and, BitDepth denotes the bit depth of the corresponding chrominance value or luminance value.

FIG. 1 shows the positions of integer samples, ½ samples and ¼ samples in the luminance sample matrix, where the positions of the integer samples are marked with capital letters, and the positions of the ½ and ¼ samples are marked with lowercase letters. The correspondence between these sample positions and the coordinates of the sample positions in the luminance sample matrix of ¼ precision is shown in Table 4, where xFracL is equal to fx&3, yFracL is equal to fy&3, and "&" denotes the "AND" operation in the bit operation.

TABLE 1

| Value of xFracL | Value of yFracL | Sample position in FIG. 1 |
|---|---|---|
| 0 | 0 | A0, 0 |
| 0 | 1 | d0, 0 |
| 0 | 2 | h0, 0 |
| 0 | 3 | n0, 0 |
| 1 | 0 | a0, 0 |
| 1 | 1 | e0, 0 |
| 1 | 2 | i0, 0 |
| 1 | 3 | p0, 0 |
| 2 | 0 | b0, 0 |
| 2 | 1 | f0, 0 |
| 2 | 2 | j0, 0 |
| 2 | 3 | q0, 0 |
| 3 | 0 | c0, 0 |
| 3 | 1 | g0, 0 |
| 3 | 2 | k0, 0 |
| 3 | 3 | r0, 0 |

In related art implementations, five motion vector precisions, e.g., ¼, ½, 1, 2, and 4, are used to reduce the number of bits consumed in encoding the motion vector difference, so that the coding efficiency is further improved. The five motion vector precisions, e.g., ¼, ½, 1, 2, and 4, are coded at the encoding-end, the best motion vector precision is selected by a distortion operation process, and the corresponding index value is written into the code stream. The index values corresponding to the five motion vector precisions are shown in Table 2.

TABLE 2

| | AmvrIndex (Index value of the motion vector precision) | | | | |
|---|---|---|---|---|---|
| | 0 | 1 | 2 | 3 | 4 |
| Resolution (Motion vector precision) | ¼ | ½ | 1 | 2 | 4 |

Because the differences in resolution, granularity, texture characteristics, and motion characteristics among various video sequences are not taken into consideration in related art implementations, the best coding efficiency and video quality cannot be obtained for a specific type of video sequence. For example, in related art implementations, the best-predicted value cannot be adaptively obtained for the current video sequence to be coded, resulting in the reduction of inter-frame prediction accuracy and low coding efficiency.

Accordingly, an embodiment of the present disclosure may provide a video encoding method, particularly an inter-frame prediction method for video. An example of this video encoding method is described in detail below.

FIG. 2 is a flowchart of an inter-frame prediction method for video according to an embodiment of the present disclosure. This method is executed at an encoding-end. As shown in FIG. 2, this method may include the following steps:

At operation S101, based on at least one of distortion aware information of a current encoding unit and distortion aware information of a corresponding reference encoding unit, a first predicted value of the current encoding unit is determined by using at least one type of interpolation filter, the at least one type of interpolation filter including an artificial intelligence (AI) interpolation filter.

In an embodiment, the current encoding unit may also be referred to as the current coding unit or the current block, and the reference encoding unit may also be referred to as reference coding unit or the reference block.

In an embodiment, "information of" a coding unit may refer to, for example, at least one of information about the coding unit, information included in the coding unit, information corresponding to the coding unit, or information associated with the coding unit.

In an embodiment, the distortion aware information of the current encoding unit may be referred to as first distortion aware information, and the distortion aware information of the corresponding reference encoding unit may be referred to as second distortion aware information.

The distortion aware information of the current coding unit may include at least one of the following: a quantization parameter of the current coding unit, and a quantization parameter difference between the current coding unit and the corresponding reference coding unit; and, the distortion aware information of the reference coding unit includes at least one of the following: a quantization parameter of the reference coding unit, and a quantization parameter difference between the current coding unit and the corresponding reference coding unit.

The quantization parameter of the current coding unit may be determined based on the quantization parameter of the reference coding unit and the quantization parameter difference; and/or, the quantization parameter of the reference coding unit may be determined based on the quantization parameter of the current coding unit and the quantization parameter difference.

In the encoding process, by introducing the quantization parameter of the current encoding unit, a more accurate predicted value of the current block can be obtained, so that the coding quality of the current block is improved.

For example, in the encoding process, if the quantization parameter (QP) of the current block is larger, this may mean that the degree of compression of the current block during encoding is greater. For example, the luminance value of the reference block may be compensated more vigorously by using the AI network during inter-frame prediction, so that a more accurate predicted value of the current block is obtained, and the coding quality of the current block is improved.

In the encoding process, by introducing the quantization parameter of the reference encoding unit corresponding to the current encoding unit, the similarity between the current encoding unit and the reference encoding unit corresponding to the compensated current encoding unit can be improved, and the code rate can be reduced.

For example, in the encoding process, the reference encoding unit corresponding to the current encoding unit is the coded reference encoding unit. If the QP of the reference encoding unit is larger, this may mean that the coded reference encoding unit is worse in quality, so that the luminance value of the reference encoding unit is compensated more vigorously by using the AI network during inter-frame prediction. If the QP of the coded reference encoding unit is smaller, this may mean that the coded reference encoding unit is better in quality, so that the luminance value of the reference encoding unit is compensated more finely by using the AI network during inter-frame prediction.

For example, in the encoding process, when the pixel precision of the current block is sub-pixel precision, interpolation filtering may be performed to obtain the predicted value. To determine the most suitable interpolation filter, multiple interpolation filters may be used to obtain the predicted value corresponding to the current block. Then, the filtering effect of the corresponding interpolation filter is compared based on each predicted value, so that the most suitable interpolation filter for the current block is determined, For example, the target interpolation filter of the current block is determined. Finally, a first predicted value of the current block is obtained by using the target interpolation filter. The used multiple interpolation filters include an AI interpolation filter. The AI interpolation filter may be an interpolation filter based on a deep neural network. For example, it may be a CNN filter. An example of a specific structure of the AI interpolation filter is given in the corresponding example below.

At operation S102, the current encoding unit is coded based on the first predicted value of the current encoding unit.

In an encoding stage according to an embodiment, the predicted value of the current encoding unit is obtained by using an interpolation filter including an AI interpolation filter, the distortion aware information of the current encoding unit and/or the corresponding reference encoding unit is introduced in the interpolation process, and the current encoding unit is coded based on the determined predicted value. According to an embodiment, the distortion aware information is taken into consideration, so that the accuracy of inter-frame prediction may be improved, and the encoding/decoding efficiency may be improved.

Figure 3:
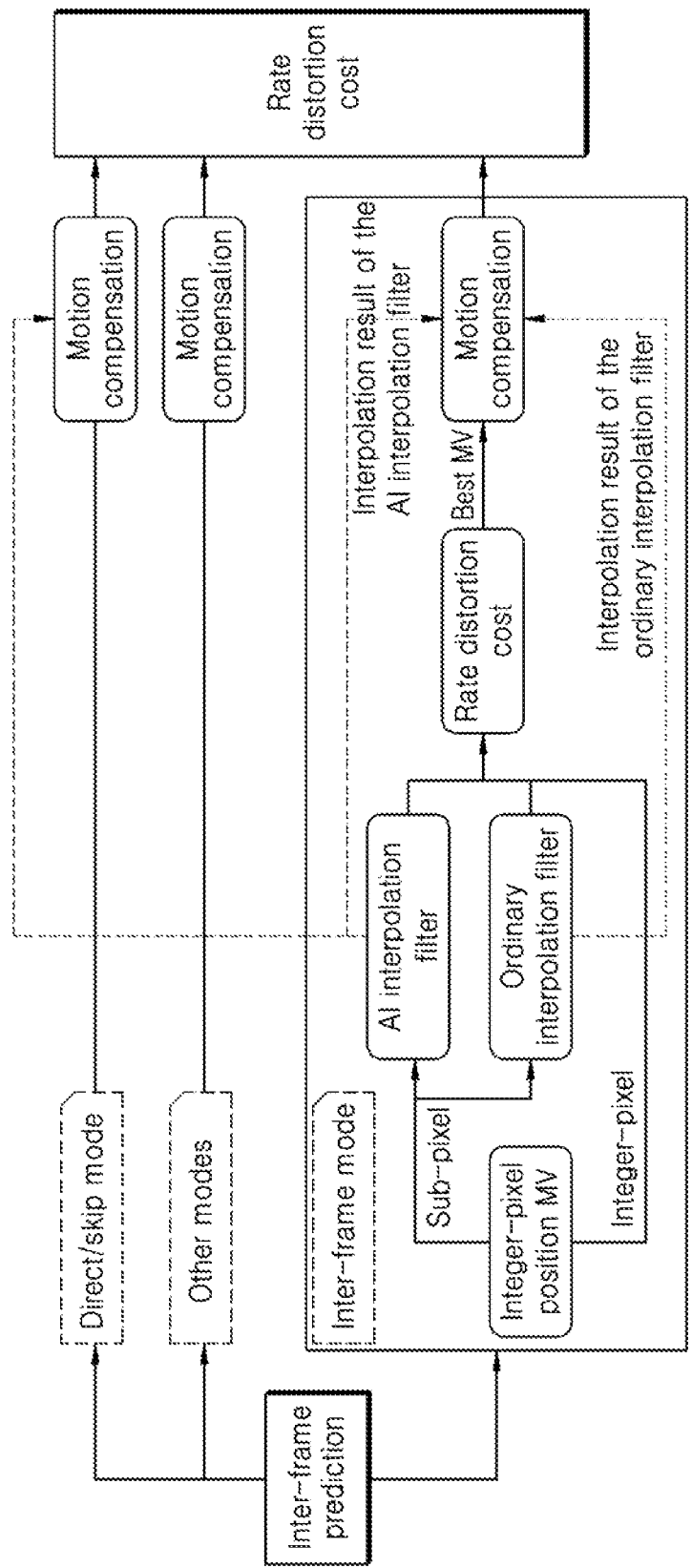
FIG. 3 is a schematic diagram of an inter-frame prediction method in a encoding stage in an example according to an embodiment of the present disclosure.

In the encoding stage, as shown in FIG. 3, the inter-frame prediction process provided in an embodiment may include the following steps.

As a first step, inter-frame prediction may be performed on the current block in three different prediction modes, examples of which are provided below.

Prediction mode 1: Inter-frame prediction is performed on the current encoding unit in a skip mode or a direct mode to obtain a first predicted value and a residual value, and the corresponding rate distortion cost is calculated.

Prediction mode 2: For the current encoding unit, a second predicted value of the current encoding unit at each sub-pixel position is determined by using an AI interpolation filter and a non-AI interpolation filter, and the corresponding rate distortion cost is calculated. Then, the interpolation filter corresponding to the second predicted value having the smallest rate distortion cost among the second predicted value is determined as a target interpolation filter, the motion vector (MV) corresponding to this second predicted value is determined as the best MV, and the corresponding rate distortion cost is calculated. This mode may also be called an inter-frame mode. The AI interpolation filter integrates the distortion information (QP) with the network input by using a distortion aware interpolation neural network, to control the degree of interpolation of the reference block. Meanwhile, the AI interpolation filter integrates the distortion information with a nonlinear activation function (e.g., a Swish function) by using the distortion adaptive nonlinear capability, to adaptively adjust the contrast of the feature map to achieve a better learning effect.

Prediction mode 3: For the current encoding unit, other inter-frame prediction modes except for the prediction mode 1 (e.g., skip mode or direct mode) and the prediction mode 2 (e.g., inter-frame mode) is adopted to obtain the first predicted value and the residual value, and the corresponding rate distortion cost is calculated.

In addition, the prediction mode 1 includes a combination of the skip mode/direct mode and an interpolation filter based on a deep neural network, or a combination of the skip mode/direct mode and a non-AI interpolation filter.

In step 2, the prediction mode with the smallest rate distortion cost is selected as the final prediction mode of the current encoding unit. For example, if the rate distortion cost corresponding to the first predicted cost in prediction mode 2 is the smallest, prediction mode 2 is used as the final prediction mode of the current encoding unit. For example, the first predicted value of the current encoding unit is determined by using the target interpolation filter and the best MV corresponding to the second predicted value with the smallest rate distortion cost determined in the prediction mode 2, and the current encoding unit is coded based on this first predicted value.

In step 3, the final prediction mode information of the current encoding unit, the encoding unit type, the interpolation filter mode (or the identification information of the interpolation filter), the residual information after transformation and quantization of the residual value, and other information are subjected to entropy coding and then written into a code stream.

For example, in the first step of the inter-prediction process corresponding to FIG. 3, the predicted value (e.g., first predicted value) of the current block is obtained in three different prediction modules, respectively, the rate distortion costs corresponding to the three different prediction modes are then compared, and the prediction mode with the smallest rate distortion cost is determined as the final prediction mode used in the encoding stage. Examples of implementation processes for the three prediction modes are described below, respectively.

For the prediction mode 1, it is assumed that the current encoding unit has a width of W and a height of H, and the position coordinates of the sample point at the top left position in the current image is (x1,y1). The process of obtaining the first predicted value of each sample point in the encoding unit may include the following steps.

As a first step of the process of obtaining the first predicted value, a candidate MV (Motion Vector) list is derived.

For example, at least one candidate MV is obtained based on the MVs corresponding to coded neighboring blocks corresponding to the current encoding unit, or at least one candidate MV is obtained in other ways, so that a candidate MV list is obtained. For the candidate MVs obtained through neighboring blocks in the candidate MV list, the corresponding interpolation filter is the same as the interpolation filter of the corresponding neighboring blocks; and, for the candidate MVs obtained in other ways in the candidate MV list, the corresponding interpolation filter is a conventional interpolation filter. For example, it is possible that the MVs of neighboring blocks of the current block are determined as candidate MVs, and the interpolation filter corresponding to the neighboring block of the current block is determined as the interpolation filter for the corresponding candidate MVs. For example, if the interpolation filter used by a certain neighboring block is an interpolation filter based on an AI network, for the candidate MVs obtained through this neighboring block, the interpolation filter used in the process of obtaining the third predicted value of the current block is also an interpolation filter based on an AI network.

As a second step of the process of obtaining the first predicted value, a third predicted value corresponding to the current encoding unit under each candidate MV is obtained.

The first reference block may also be called a first reference block matrix hereinafter.

For example, a plurality of candidate MVs and the interpolation filter mode corresponding to each candidate MV are determined in the above steps. For example, for each candidate MV using the interpolation filter based on a deep neural network, the process of obtaining the corresponding third predicted value may include the following steps.

As a first step of the process of obtaining the third predicted value, the sample point (x2,y2) at the top left position in the sample matrix pointed by the current encoding unit in the reference image is derived according to the current encoding information.

The top left position (x2,y2) of the reference block matrix pointed by the current encoding unit in the reference image is derived according to the position coordinates (x1,y1) of the sample point of the current encoding unit at the top left position in the current image and the motion vector information. Where, x2=(x1 <<2)+MVx, y2=(y1<<2)+MVy, "<<" denotes a left shifting operation, and MVx and MVy are the x component and the y component of the MV (e.g., candidate MV) of the current encoding unit and have a basic unit of ¼ precision; and, x2 and y2 may be or may not be the position of the integer-pixel sample point.

As a second step of the process of obtaining the third predicted value, the derived top left position (x2, y2) of the reference block matrix is moved to the position (x2', y2') of the nearest integer-pixel sample point according to the specified rule, to obtain a first reference block matrix. The first reference block matrix has a width of W and a height of H.

As a third step of the process of obtaining the third predicted value, the position xFrac, yFrac of a sub-pixel point is obtained according to the top left position (x2,y2) of the reference block matrix, where xFrac=x2&3, and yFrac=y2&3.

As a fourth step of the process of obtaining the third predicted value, if both xFrac and yFrac are 0, at the integer-pixel position, the first reference block matrix is used as the predicted value of the current encoding unit; otherwise, the fifth through eighth steps of the process of obtaining the third predicted value may be performed.

As a fifth step of the process of obtaining the third predicted value, the first reference block matrix is expanded according to the information of the convolution kernel in the deep neural network to obtain a first input matrix. The first input matrix has position coordinates of (x3,y3) in the current image, and has a width of W+12 and a height of H+12, wherein, x3=x2'−(6<<2), and y3=y2'−(6<<2).

As a sixth step of the process of obtaining the third predicted value, the position index of the output layer of the neural network corresponding to the interpolation filter based on the deep neural network is obtained according to the position of the sub-pixel point, where index=layers [xFrac*4+yFrac−1], and layers is the correspondence between the sub-pixel position and the position of the output layer of the neural network.

As a seventh step of the process of obtaining the third predicted value, the first reference block quantization matrix is generated by using the obtained quantization parameter (or the quantization step or quantization error derived from the quantization parameter) of the first reference block. The first reference block quantization matrix has the same size as the input matrix, where the element value at the position of each sample point in the first reference block quantization matrix is equal to the quantization parameter (or the quantization step or quantization error derived from the quantization parameter) of the first reference block. A current encoding unit quantization matrix (e.g., a current block quantization matrix) is generated by using the obtained quantization parameter (or the quantization step or quantization error derived from the quantization parameter) of the current encoding unit. The current encoding unit quantization matrix has the same size as the input matrix, where the element value of the position of each sample point in the current encoding unit quantization matrix is equal to the quantization parameter (or the quantization step or quantization error derived from the quantization parameter) of the current encoding unit. A difference between the obtained quantization parameter (or the quantization step or quantization error derived from the quantization parameter) of the current encoding unit and the obtained quantization parameter (or the quantization step or quantization error derived from the quantization parameter) of the first reference block is obtained to obtain a difference quantization matrix. The difference quantization matrix has the same size as the input matrix, where the element value of the position of each sample point in the difference quantization matrix is equal to the difference between the obtained quantization parameter (or the quantization step or quantization error derived from the quantization parameter) of the current encoding unit and the obtained quantization parameter (or the quantization step or quantization error derived from the quantization parameter) of the first reference block.

The quantization parameter of the first reference block may be obtained from the quantization parameter of the reference image.

As an eighth step of the process of obtaining the third predicted value, each quantization matrix (corresponding to the QP map in FIG. 3) and the input matrix are input into the deep neural network, and the element value of each sample point in the (index)th layer sample matrix output by the deep neural network is used as the third predicted value of the current encoding unit.

As a third step of the process of obtaining the first predicted value, the corresponding rate distortion cost is obtained based on the third predicted value corresponding to each candidate MV, the candidate MV with the smallest rate distortion cost among the candidate MVs is determined as the best MV, and the third predicted value corresponding to the best MV is determined as the first predicted value corresponding to the current block.

For prediction mode 2, it is assumed that the current encoding unit has a width of W and a height of H, and the position coordinates of the sample point at the top left position in the current image is (x1,y1).

In an embodiment, determining the first predicted value of the current encoding unit may include:

determining, based on the distortion aware information of the current encoding unit and/or the corresponding reference encoding unit, a second predicted value corresponding to each sub-pixel position of the current encoding unit by using at least one type of interpolation filter; and determining the first predicted value of the current encoding unit based on the second predicted value corresponding to each sub-pixel position of the current encoding unit.

Further, the determining a second predicted value corresponding to each sub-pixel position of the current encoding unit may include:

obtaining an MV corresponding to an integer-pixel position of the current encoding unit; and determining, based on a reference encoding unit corresponding to the MV, the second predicted value of the current encoding unit corresponding to each sub-pixel position of the current encoding unit by using the at least one type of interpolation filter.

For example, the MV (e.g., the first target MV) of the current encoding unit in the integer-pixel unit is obtained by motion search. Then, the second predicted values of the current encoding unit at different sub-pixel positions are determined by using various interpolation filters, the rate distortion cost of each second predicted value is calculated, and the interpolation filter corresponding to the second predicted value with the smallest rate distortion cost is determined as a target interpolation filter, and the MV corresponding to this second predicted value is determined as a second target MV (e.g., the best MV in FIG. 3). After motion compensation is performed based on the target interpolation filter and the second target MV, the first predicted value of the current encoding unit is obtained. The interpolation filters include an AI interpolation filter.

In an embodiment, the determining, based on a reference encoding unit corresponding to the MV, the second predicted value of the current encoding unit corresponding to each sub-pixel position of the current encoding unit by using the AI interpolation filter may include:

obtaining, based on at least one of the quantization parameter of the current encoding unit, the quantization parameter of the reference encoding unit, or the quantization parameter difference between the current encoding unit and the corresponding reference encoding unit, the second predicted value corresponding to each sub-pixel position of the current encoding unit by using the AI interpolation filter.

In an embodiment, the obtaining, based on at least one of the quantization parameter of the current encoding unit, the quantization parameter of the reference encoding unit, or the quantization parameter difference between the current encoding unit and the corresponding reference encoding unit, the second predicted value corresponding to each sub-pixel position of the current encoding unit by using the AI interpolation filter may include:

expanding the reference encoding unit to a preset or predetermined size to obtain a corresponding input matrix;

inputting, into at least one cascaded convolution unit of the AI interpolation filter, the input matrix and at least one of the following: the quantization parameter of the current encoding unit, the quantization parameter of the reference encoding unit, and the quantization parameter difference between the current encoding unit and the corresponding reference encoding unit; and performing a convolution operation by the convolution layer of the convolution unit, and processing the convolution result of the convolution layer by the nonlinear activation layer of the convolution unit to obtain the second predicted value corresponding to the corresponding sub-pixel position of the current encoding unit.

For example, by introducing at least one cascaded convolution unit, a more accurate predicted value of the current encoding unit can be obtained in the encoding process, and the encoding quality of the current encoding unit can be further improved. Each convolution unit consists of a convolution layer and an activation layer, and the activation layer employs a nonlinear activation function that is used to improve the fitting degree of the AI network to nonlinear texture, so that the resolution of the coded contour is improved.

In an embodiment, a nonlinear activation function is used in the nonlinear activation layer of the AI interpolation filter, wherein common nonlinear activation functions include Sigmoid activation functions, Tanh activation functions, SoftMax activation functions, Swish activation functions, etc. In an embodiment, taking a Swish activation function as an example, the Swish activation function is used as the activation function in the AI interpolation filter, and the quantization parameter of the current encoding unit is used as an input to the activation function, so that the integrated activation function is a QPSwish activation function. The QPSwish activation function will change with the quantization parameter of the current encoding unit to dynamically adjust the compensation degree of the activation function to the output of the convolution layer. When the QP of the current encoding unit is larger, the activation layer will map the convolution result output by the convolution result to a smaller dynamic range, thereby improving the image contrast of the output result of the activation layer to a greater extent. When the QP of the current encoding unit is smaller, the activation layer will map the convolution result output by the convolution layer to a larger dynamic range than that in the case of a larger QP, but the dynamic range at this time should be smaller than the luminance dynamic range of the original output result, thereby improving the image contrast of the output result of the activation layer to a smaller extent.

In an embodiment, the quantization parameter of the current encoding unit is introduced into the activation function, wherein the quantization parameter and the activation function may have one of the following mathematical relationships: reciprocal relationship, multiple relationship, and power relationship. In an embodiment, taking a reciprocal relationship and a Swish function as an example, the activation function may be expressed according to Equation 19 below:

$$\text{QPswish}(x) = x \cdot \text{sigmoid}(x \cdot 1/QP) \qquad \text{Equation 19}$$

In Equation 19 above, QP denotes the quantization parameter of the current encoding unit, and x denotes the output result of the convolution layer corresponding to the activation layer.

The nonlinear activation layer will adjust the nonlinear compensation degree of the activation function by using the adaptive QP value, so that a more accurate predicted value of the current encoding unit is obtained and the coding quality of the current encoding unit is further improved.

The second reference block may also be called a second reference block matrix hereinafter.

For example, the purpose of interpolation is to obtain a block that is more similar to the current block. Therefore, similarity is the most important index for determining the network result. In addition, if the QP value of the reference block is closer to the QP value of the block to be coded, it is easier to obtain a result with high similarity between them.

In this mode, a process for obtaining the second predicted value of the current block by using the interpolation filter based on the deep neural network may include the following steps.

As a first step of the process for obtaining the second predicted value, the current best integer-pixel position MV (MVx,MVy) is obtained by motion search, where MVx and MVy have a basic unit of ¼ precision. For example, the first best MV (e.g., first target MV) corresponding to the current block at the integer-pixel position is obtained by motion search.

As a second step of the process for obtaining the second predicted value, the sample point (x2,y2) at the top left position in the sample matrix pointed by the current encoding unit in the reference image is derived according to the current encoding information.

The top left position (x2,y2) of the reference block matrix pointed by the current encoding unit in the reference image is derived according to the position coordinates (x1,y1) of the sample point of the current encoding unit at the top left position in the current image and the motion vector information. Where, x2=(xl <<2)+MVx, y2=(y1<<2)+MVy, "<<" denotes a left shifting operation, and MVx and MVy are the x component and the y component of the motion vector value of the current encoding unit and have a basic unit of ¼ precision; and, x2 and y2 may be or may not be the position of the integer-pixel sample point.

As a third step of the process for obtaining the second predicted value, the derived top left position (x2,y2) of the reference block matrix is moved to the position (x2',y2') of the nearest integer-pixel sample point according to the specified rule, to obtain a second reference block matrix. The second reference block matrix has a width of W and a height of H.

As a fourth step of the process for obtaining the second predicted value, the second reference block matrix is expanded according to the information of the convolution kernel in the deep neural network to obtain a second input matrix. The second input matrix has position coordinates of (x3,y3) in the current image, and has a width of W+12 and a height of H+12, where x3=x2'-(6<<2), and y3=y2'-(6«2).

As a fifth step of the process for obtaining the second predicted value, the second input matrix is further expanded, with one more row up and one more column to the left. The position of the expanded final second input matrix in the current image is (x4,y4), and the final second input matrix has a width of w+13 and a height of H+13, where x4=x3-(1<<2), and y4=y3-(1<<2).

As a sixth step of the process for obtaining the second predicted value, a second reference block quantization matrix is generated by using the obtained quantization parameter (or the quantization step or quantization error derived from the quantization parameter) of the second reference block. The second reference block quantization matrix has the same size as the input matrix, where the element value at the position of each sample point in the second reference block quantization matrix is equal to the quantization parameter (or the quantization step or quantization error derived from the quantization parameter) of the second reference block. A current encoding unit quantization matrix (e.g., a current block quantization matrix) is generated by using the obtained quantization parameter (or the quantization step or quantization error derived from the quantization parameter) of the current encoding unit. The current encoding unit quantization matrix has the same as the input matrix, where the element value of the position of each sample point in the current encoding unit quantization matrix is equal to the quantization parameter (or the quantization step or quantization error derived from the quantization parameter) of the current encoding unit. A difference between the obtained quantization parameter (or the quantization step or quantization error derived from the quantization parameter) of the current encoding unit and the obtained quantization parameter (or the quantization step or quantization error derived from the quantization parameter) of the second reference block is obtained to obtain a difference quantization matrix. The difference quantization matrix has the same size as the input matrix, where the element value of the position of each sample point in the difference quantization matrix is equal to the difference between the obtained quantization parameter (or the quantization step or quantization error derived from the quantization parameter) of the current encoding unit and the obtained quantization parameter (or the quantization step or quantization error derived from the quantization parameter) of the second reference block.

The quantization parameter of the second reference block may be obtained from the quantization parameter of the reference image.

As a seventh step of the process for obtaining the second predicted value, each quantization matrix and the second input matrix are input into the deep neural network, and the predicted values corresponding to 15 sub-pixel positions output by the deep neural network are stored in a sub-pixel predicted value matrix, where the predicted value matrix corresponding to each sub-pixel position has a width of W+1 and a height of H+1.

As an eighth step of the process for obtaining the second predicted value, if the pixel precision of the current encoding unit is ½ pixel precision, a ½ pixel position motion search is continuously performed. The search range is 8 position points around the current best integer motion vector, For example, the value range of {MVDx,MVDy} is {{-2,0}, {-2,2}, {0,2}, {2,2}, {2,0}, {2,-2}, {0,-2}, {-2,-2}}. For each sub-pixel position, the corresponding second predicted value is read from the sub-pixel predicted value matrix, and the best MV is selected from the best integer-pixel position MV and the MVs of candidate ½ pixel positions. For example, the target MV is determined from the first target MV and the MV corresponding to each ½ sub-pixel position. In this case, the best motion vector is denoted by MVx2,MVy2. The value of the current ½ pixel position MV is MVx1=MVx+MVDx1,MVy1=MVy+MVDy1. Wherein, MVDx1 is the movement value of the MV in the x direction, MVDy1 is the movement value of the MV in they direction, and the both have a basic unit of ¼ precision. When MVx1<MVx, the x-coordinate of the corresponding predicted value matrix is 0 to W; otherwise, the x-coordinate of the corresponding predicted value matrix is 1 to W+1. When MVy1<MVy, the y-coordinate of the corresponding predicted value matrix is 0 to H; otherwise, the y-coordinate of the corresponding predicted value matrix is 1 to H+1. The predicted value matrix has a width of W and a height of H.

In this case, determining the target MV from the first target MV and the MV corresponding to each ½ sub-pixel position may be as follows: comparing the second predicted value corresponding to the best integer-pixel position and the second predicted value corresponding to each ½ sub-pixel position with the original value of the current encoding unit, respectively, to obtain the SATD (sum of absolute transformed difference) corresponding to each position, then comparing the SATD corresponding to each position, and using the MV corresponding to the position with the smallest SATD as the target MV. In step 9, it is also possible to determine the target MV by comparing the SATD of each position.

As a ninth step of the process for obtaining the second predicted value, if the pixel precision of the current encoding unit is ¼ pixel precision, a ¼ pixel position motion search is continuously performed on the basis of the eighth step of the process for obtaining the second predicted value. The search range is 8 position points around the best integer motion vector in step 8, For example, the value range of {MVDx2,MVDy2} is {{−1,0}, {0,1}, {1,0}, {0,−1}, {−1, 1}, {1,1}, {−1,−1}, {1,−1}}. For each sub-pixel position, the corresponding second predicted value is read from the predicted value matrix, and the best MV is selected from the best MV in step 8 (e.g., the second best MV or second target MV in this case) and the MVs of 8 current candidate ¼ pixel positions. For example, the target MV is determined from the second target MV and the MV corresponding to each ¼ sub-pixel position. In this case, the best motion vector is denoted by MVx4,MVy4. The value of the current ¼ pixel position MV is MVx3=MVx2+MVDx2,MVy3=MVy2+MVDy2. Wherein, MVDx2 is the movement value of the MV in the x direction, MVDy2 is the movement value of the MV in they direction, and the both have a basic unit of ¼ precision. When MVx3<MVx, the x-coordinate of the corresponding predicted value matrix is 0 to W; otherwise, the x-coordinate of the corresponding predicted value matrix is 1 to W+1. When MVy3<MVy, the y-coordinate of the corresponding predicted value matrix is 0 to H; otherwise, the y-coordinate of the corresponding predicted value matrix is 1 to H+1. The predicted value matrix has a width of W and a height of H.

Figure 4A:
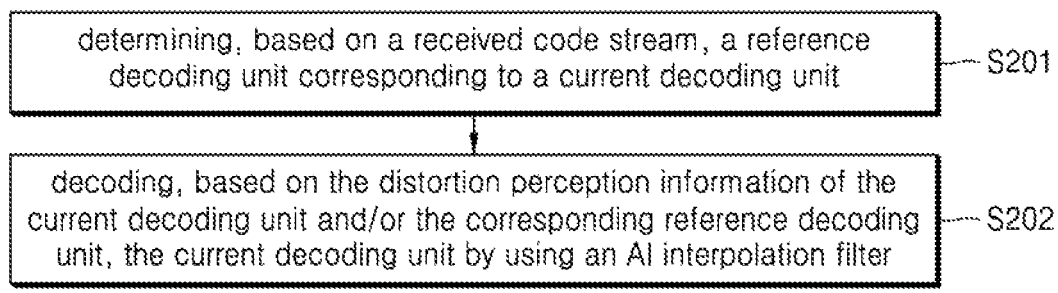
FIG. 4A is a flowchart of a video decoding method according to an embodiment of the present disclosure.

FIG. 4A is a flowchart of a video decoding method, particularly an inter-frame prediction method, according to an embodiment of the present disclosure. This method is executed at a decoding-end. As shown in FIG. 4A, the video decoding method may include the following operations.

At operation S201, a reference decoding unit corresponding to a current decoding unit is determined based on the received code stream.

For example, the interpolation filter information used, the monition vector precision information determined and the reference encoding unit used by the current decoding unit in a decoding stage may be obtained from the code stream. In the decoding stage, the current decoding unit is decoded based on the interpolation filter information and the motion vector precision information by using the reference encoding unit as a reference decoding unit.

At operation S202, the current decoding unit is decoded based on the distortion aware information of the current decoding unit and/or the corresponding reference decoding unit by using an AI interpolation filter.

For example, the current decoding unit may be decoded based on the distortion aware information of the current decoding unit and/or the corresponding reference decoding unit by using the AI interpolation filter to obtain a predicted value of the current decoding unit.

In an embodiment, the distortion aware information of the current decoding unit may be referred to as first distortion aware information, and the distortion aware information of the corresponding reference decoding unit may be referred to as second distortion aware information.

In a decoding stage according to an embodiment, the predicted value of the current decoding unit is obtained by using the AI interpolation filter, the distortion aware information of the current decoding unit and/or the corresponding reference decoding unit is introduced in the interpolation process, and the current decoding unit is decoded based on the determined predicted value. According to an embodiment, the distortion aware information is taken into consideration, so that the accuracy of inter-frame prediction may be improved, and the encoding/decoding efficiency may be improved.

In an embodiment, the distortion aware information of the current decoding unit includes at least one of the following: a quantization parameter of the current decoding unit, and a quantization parameter difference between the current decoding unit and the corresponding reference decoding unit; and/or the distortion aware information of the reference decoding unit includes at least one of the following: a quantization parameter of the reference decoding unit, and a quantization parameter difference between the current decoding unit and the corresponding reference decoding unit.

In an embodiment, the quantization parameter of the current decoding unit is determined by the quantization parameter of the reference decoding unit and the quantization parameter difference; and/or the quantization parameter of the reference decoding unit is determined by the quantization parameter of the current decoding unit and the quantization parameter difference.

In an embodiment, the AI interpolation filter includes at least one convolution unit, and the at least one convolution unit includes at least one convolution layer and at least one nonlinear activation layer;

wherein the at least one nonlinear activation layer processes, based on the distortion aware information of the current decoding unit, the convolution result output by the cascaded convolution layer.

In an embodiment, the at least one nonlinear activation layer processes, by using activation parameters determined based on the distortion aware information of the current decoding unit, the convolution result output by the cascaded convolution layer.

In an embodiment, the decoding, based on the distortion aware information of the current decoding unit and/or the corresponding reference decoding unit, the current decoding unit by using an AI interpolation filter may include:

obtaining, based on the distortion aware information of the current decoding unit and/or the corresponding reference decoding unit and the motion vector precision information obtained from the code stream, a predicted value of the current decoding unit by using the AI interpolation filter.

Figure 4B:
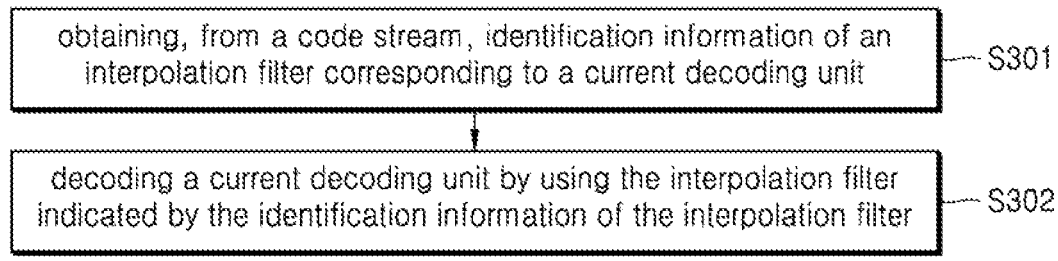
FIG. 4B is a flowchart of a video decoding method according to an embodiment of the present disclosure.

FIG. 4B is a flowchart of another video decoding method, particularly an inter-frame prediction method, according to an embodiment of the present disclosure. This method is executed at a decoding-end. As shown in FIG. 4B, this method may include the following steps.

At operation S301, identification information of an interpolation filter corresponding to a current decoding unit is obtained from a code stream.

For example, the identification information of the interpolation filter is obtained from the code stream, and the interpolation filter indicated by the identification information of the interpolation filter is determined as the interpolation filter to be used in the decoding stage.

At operation S302, a current decoding unit is decoded by using the interpolation filter indicated by the identification information of the interpolation filter.

In an embodiment, if the interpolation filter indicated by the identification information of the interpolation filter is an AI interpolation filter, decoding the current decoding unit may include:

decoding, based on distortion aware information of the current decoding unit and/or the corresponding reference decoding unit, the current decoding unit by using the AI interpolation filter.

In an embodiment, in the decoding stage, the current decoding block may also be referred to as a current coding unit or a current block and the reference decoding block may also be referred to as a reference coding unit or a reference block.

Figure 5:
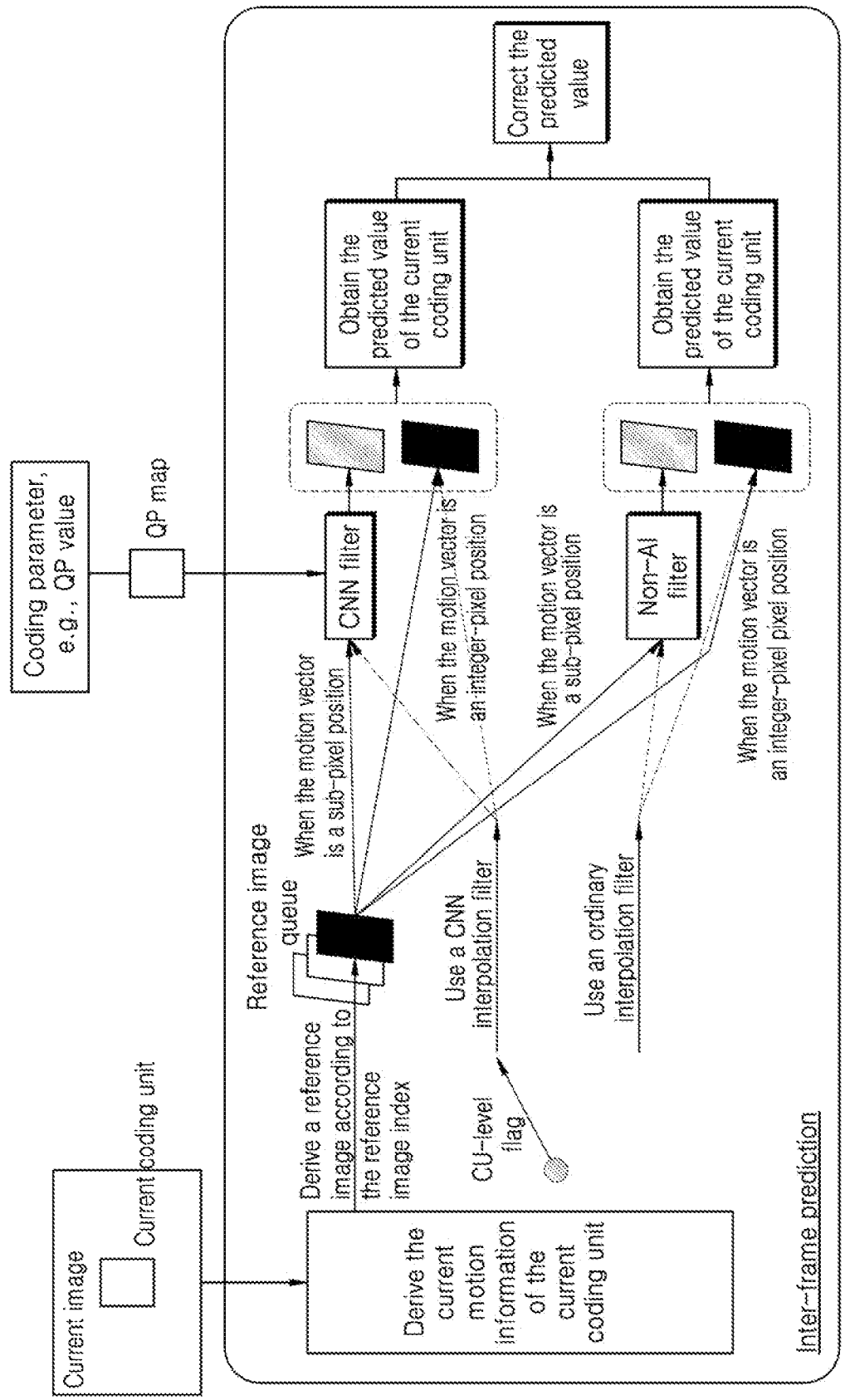
FIG. 5 is a schematic diagram of an inter-frame prediction method in a decoding stage in an example according to an embodiment of the present disclosure.

In the decoding stage, as shown in FIG. 5, an inter-frame prediction process provided in an embodiment may include the following steps.

As a first step of the inter-frame prediction process corresponding to FIG. 5, the encoding information of the current encoding unit (e.g., current block) is obtained from the code stream. The encoding information contains the CU (coding unit)-level flag in FIG. 5. This CU-level flag is a CU-level flag bit. In an embodiment, the preset or predetermined CU-level flag bit may be used as the identification information of the interpolation filter used by the current block in the encoding stage.

As a second step of the inter-frame prediction process corresponding to FIG. 5, the sample point at the top left position in the sample matrix pointed by the current encoding unit in the reference image is derived according to the encoding information.

As a third step of the inter-frame prediction process corresponding to FIG. 5, the predicted value of the current encoding unit is derived.

If a deep neural network is used, the sample matrix pointed in the reference image is first preprocessed; a reference block quantization matrix, a current encoding unit quantization matrix and a difference between the reference block quantization matrix and the current encoding unit quantization matrix are derived according to the encoding information; the preprocessed sample matrix pointed in the reference image and each quantization matrix are input into the trained deep neural network; and, a predicted sample matrix is output from the deep neural network. Otherwise, the predicted sample matrix is calculated by using a non-AI interpolation filter (for example the non-AI filter illustrated in FIG. 5).

As a fourth step of the inter-frame prediction process corresponding to FIG. 5, the predicted value is improved to obtain the final predicted value of the current encoding unit.

For example, performing inter-frame prediction by using an interpolation filter based on a deep neural network (corresponding to the CNN interpolation filter or CNN filter in FIG. 5) may include the following steps.

As a first step of performing the inter-frame prediction, the encoding information of the current encoding unit is obtained.

For example, the encoding information may include at least encoding unit information and quantization parameter information; the quantization parameter information may at least include the quantization parameter information of the current encoding unit and the quantization parameter information of the reference block; and, the encoding unit information may include at least: the width W and height H of the current encoding unit, the type of the current encoding unit, the adaptive motion vector precision index value (Amvrindex), prediction reference mode, reference index, motion vector difference information (e.g., the motion vector difference of the x component is MVDx, and the motion vector difference of they component is MVDy), and interpolation filter mode. Wherein, x1 is the x-coordinate, y1 is the y-coordinate, and both x1 and y1 are integer-pixel point positions.

If the type of the current encoding mode is a skip mode or direct mode, the interpolation filter mode determination way is the same as the way of determining the interpolation filter mode when the encoding-end is in the skip mode or direct mode; and, if the type of the current encoding unit is other inter-frame prediction modes except for the skip mode and the direct mode, the interpolation filter mode may be directly obtained from the code stream.

As a second step of performing the inter-frame prediction, the sample point (x2,y2) at the top left position in the sample matrix pointed by the current encoding unit in the reference image is derived according to the encoding information.

The top left position (x2,y2) of the reference block matrix pointed by the current encoding unit in the reference image is derived according to the position coordinates (x1,y1) of the sample point of the current encoding unit at the top left position in the current image and the motion vector information. Where, $x2=(x1<<2)+MVPx\pm(MVDx<<AmvrIndex)$, $y2=(y1<<2)+MVPy-k(MVDy<<AmvrIndex)$, "<<" denotes a left shifting operation, and MVPx and MVPy are the x component and the y component of the motion vector predicted value of the current encoding unit derived from the encoding unit information and have a basic unit of ¼ precision; and, x2 and y2 may be or may not be the position of the integer-pixel sample point.

As a third step of performing the inter-frame prediction, the sample matrix of the current encoding unit is derived.

If the interpolation filter mode of the current encoding unit is a deep neural network interpolation filter, the process proceeds to step 4; otherwise, the process proceeds to step 5.

Figure 6:
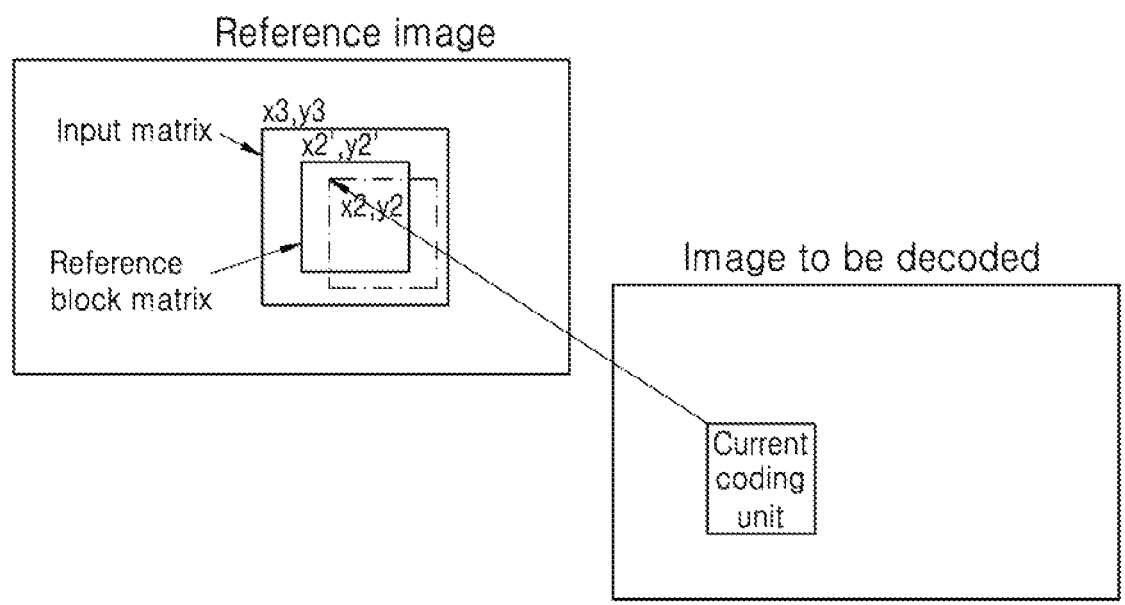
FIG. 6 is a schematic diagram of a reference block matrix and an input matrix corresponding to the current encoding unit in an example according to an embodiment of the present disclosure.

As a fourth step of performing the inter-frame prediction, the deep neural network interpolation filter is applied to obtain a predicted sample matrix. In an embodiment, the applying of the deep neural network interpolation filter may include the following:

As a first step of applying the deep neural network interpolation filter, the derived top left position (x2,y2) of the reference block matrix is moved to the position (x2',y2') of the nearest integer-pixel sample point according to the specified rule, to obtain a reference block matrix (for example as shown in FIG. 6). The reference block matrix has a width of W and a height of H.

As a second step of applying the deep neural network interpolation filter, the position xFrac,yFrac of a sub-pixel point is obtained according to the top left position (x2,y2) of the reference block matrix, where xFrac=x2&3, and yFrac=y2&3.

As a third step of applying the deep neural network interpolation filter, if both xFrac and yFrac are 0, at the integer-pixel position, the reference block matrix is used as the predicted value of the current encoding unit; otherwise, the application of the deep neural network interpolation filter may continue as described below.

As a fourth step of applying the deep neural network interpolation filter, the reference block matrix is expanded according to the information of the convolution kernel in the deep neural network to obtain an input matrix (as shown in FIG. 6). The input matrix has position coordinates of (x3,y3) in the current image, and has a width of W+12 and a height of H+12, where x3=x2'−(6<<2), and y3 y2'−(6«2).

As a fifth step of applying the deep neural network interpolation filter, the corresponding position index of the output layer of the neural network is obtained according to the sub-pixel point position, where index=layers[xFrac*4+yFrac-1], and layers is the correspondence between the sub-pixel position and the position of the output layer of the neural network.

As a sixth step of applying the deep neural network interpolation filter, a reference block quantization matrix is generated by using the obtained quantization parameter (or the quantization step or quantization error derived from the quantization parameter) of the reference block. The reference block quantization matrix has the same size as the input matrix, where the element value at the position of each sample point in the reference block quantization matrix is equal to the quantization parameter (or the quantization step or quantization error derived from the quantization parameter) of the reference block.

A current encoding unit quantization matrix (e.g., a current block quantization matrix) is generated by using the obtained quantization parameter (or the quantization step or quantization error derived from the quantization parameter) of the current encoding unit. The current encoding unit quantization matrix has the same as the input matrix, where the element value of the position of each sample point in the current encoding unit quantization matrix is equal to the quantization parameter (or the quantization step or quantization error derived from the quantization parameter) of the current encoding unit.

A difference between the obtained quantization parameter (or the quantization step or quantization error derived from the quantization parameter) of the current encoding unit and the obtained quantization parameter (or the quantization step or quantization error derived from the quantization parameter) of the reference block is obtained to obtain a difference quantization matrix. The difference quantization matrix has the same size as the input matrix, where the element value of the position of each sample point in the difference quantization matrix is equal to the difference between the obtained quantization parameter (or the quantization step or quantization error derived from the quantization parameter) of the current encoding unit and the obtained quantization parameter (or the quantization step or quantization error derived from the quantization parameter) of the reference block.

As a seventh step of applying the deep neural network interpolation filter, the quantization matrix and the input matrix are input into the neural network, and the element value of each sample point in the (index)th layer sample matrix output by the neural network is used as the predicted value of the current encoding unit.

Figure 7:
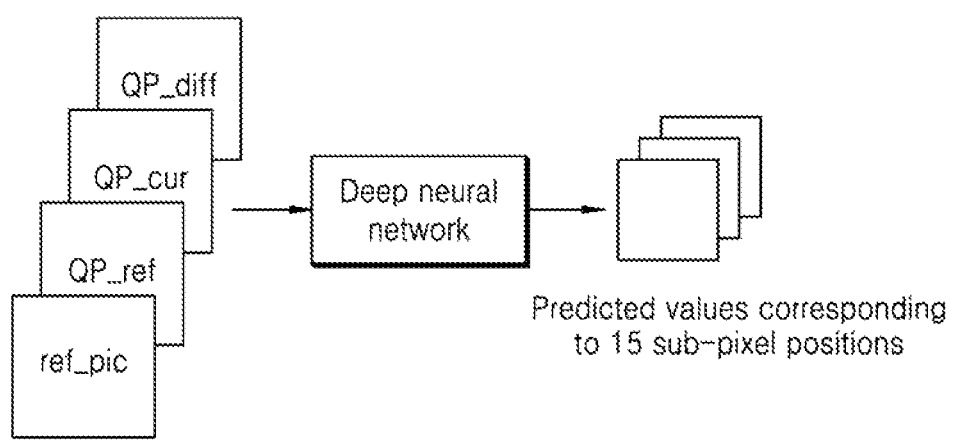
FIG. 7 is a schematic diagram of the input and output of a deep neural network for inter-frame prediction in an example according to an embodiment of the present disclosure.

In an embodiment, as shown in FIG. 7, the process of obtaining the predicted value (e.g., the first predicted value or second predicted value) by the interpolation filter based on the deep neural network may include:

obtaining the corresponding current block quantization matrix (cur QP), reference block quantization matrix (ref QP) and difference quantization matrix (curQP-refQP) based on the quantization parameter of the current block and the quantization parameter of the reference block (refpic); and inputting the current block quantization matrix, the reference block quantization matrix and the difference quantization matrix into the deep neural network to obtain the corresponding predicted value.

The input feature of the deep neural network may be the current block quantization matrix, or the current block quantization matrix and the reference block quantization matrix, or the current block quantization matrix, the reference block quantization matrix and the reference quantization matrix. In other words, the first predicted value of each sample point in the current block is obtained based on the texture feature; or, the first predicted value of each sample point in the current block is obtained based on the texture feature and the reference block quantization matrix; or, the first predicted value of each sample point in the current block is obtained based on the texture feature, the current block quantization matrix, the reference block quantization matrix and the difference quantization matrix.

Further, examples of specific implementations of the deep neural network are described below.

Figure 8:
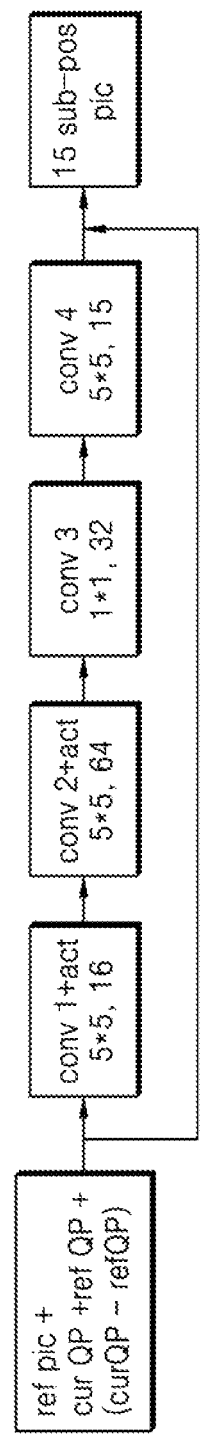
FIG. 8 is a schematic structure diagram of a deep neural network for an inter-frame prediction encoding-end in an example according to an embodiment of the present disclosure.

As shown in FIG. 8, the first three CNN layers (illustrated as conv1 to conv3) are feature extraction layers, wherein the first CNN layer has total 16 convolution kernels, each of which is 5; the second CNN layer has total 64 convolution kernels, each of which is 5; and, the third CNN layer has total 32 convolution kernels, each of which is 1. The last CNN layer (conv4) is designed as a prediction layer, which outputs the prediction values (sub-pos pic) of sub-pixel positions, where the CNN layer has total 15 convolution kernels, each of which is 5.

Figure 9:
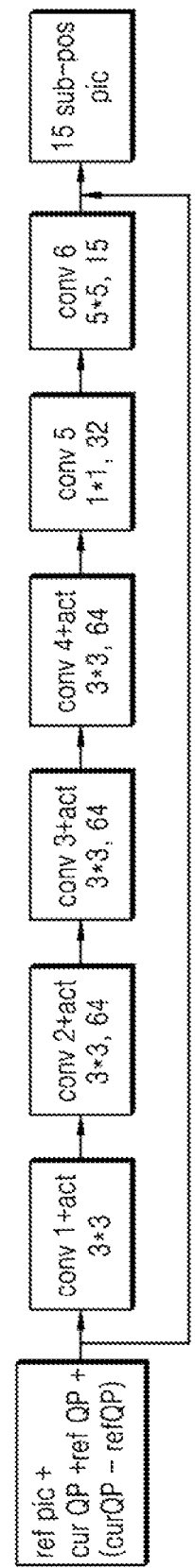
FIG. 9 is a schematic structure diagram of a deep neural network for an inter-frame prediction encoding-end in an example according to an embodiment of the present disclosure.

As shown in FIG. 9, first five CNN layers (illustrated as conv1 to conv5) are feature extraction layers, wherein the first CNN layer has total 16 convolution kernels, each of which is 3; the second CNN layer has total 64 convolution kernels, each of which is 3; the third CNN layer has total 64 convolution kernels, each of which is 3; the fourth CNN layer has total 64 convolution kernels, each of which is 3; and, the fifth CNN layer has total 32 convolution kernels, each of which is 1. The last CNN layer (conv6) is designed as a prediction layer, which outputs the prediction values of 15 sub-pixel positions, where the CNN layer has total 15 convolution kernels, each of which is 5.

In an embodiment, the "act" in FIGS. 8 and 9 may denote the activation layer corresponding to the CNN layer.

Figure 10A:
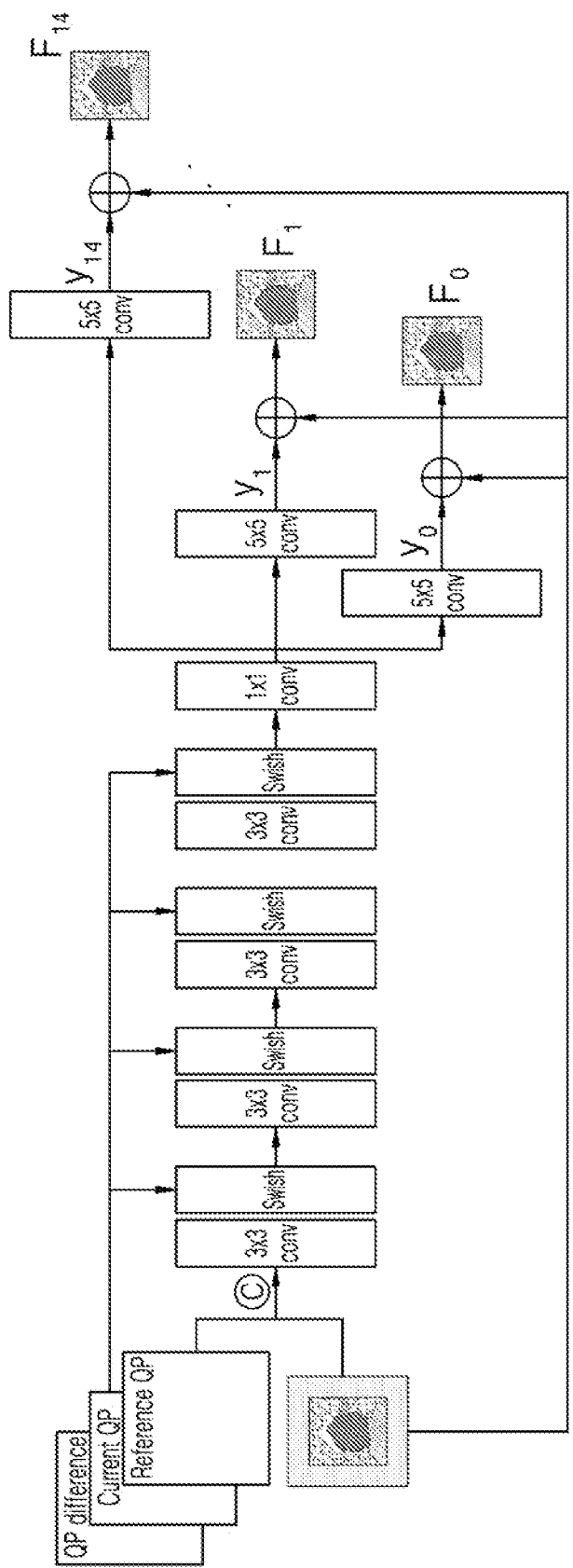
FIG. 10A is a schematic structure diagram of still another deep neural network for an inter-frame prediction encoding-end in an example according to an embodiment of the present disclosure.

In an embodiment, at the encoding-end, the AI interpolation filter includes at least one convolution unit, and the at least one convolution unit includes at least one convolution layer and at least one nonlinear activation layer, wherein the at least one nonlinear activation layer processes, based on the distortion aware information of the current encoding unit, the convolution result output by the cascaded convolution layer. The at least one nonlinear activation layer processes, by using activation parameters determined based on the distortion aware information of the current encoding unit, the convolution result output by the cascaded convolution layer. For example, as shown in FIG. 10A, the first five CNN layers (illustrated as conv1 to conv5) are feature extraction layers, wherein the first CNN layer has total of 16 convolution kernels, each of which is 3; the second CNN layer has total 64 convolution kernels, each of which is 3; the third CNN layer has total 64 convolution kernels, each of which is 3; the fourth CNN layer has total 64 convolution kernels, each of which is 3; and, the fifth CNN layer has total 32 convolution kernels, each of which is 1. The nonlinear activation functions for the first four CNN layers are all Swish functions for adaptive adjustment based on the current block quantitation matrix (illustrated as the Current QP), the reference block quantization matrix (illustrated as the Reference QP) and the reference quantization matrix (illustrated as the QP difference). The last CNN layer (conv6) is designed as a prediction layer, which outputs the prediction values ($F_0$ to $F_{14}$) of 15 sub-pixel positions, where the CNN layer has total 15 convolution kernels, each of which is 5. The AI interpolation filter can adaptively adjust the interpolation coefficient by considering the distortion information. By using different filters for different feature contents, the problem of noise introduction is greatly reduced, and the interpolation error rate is also reduced.

Figure 10B:
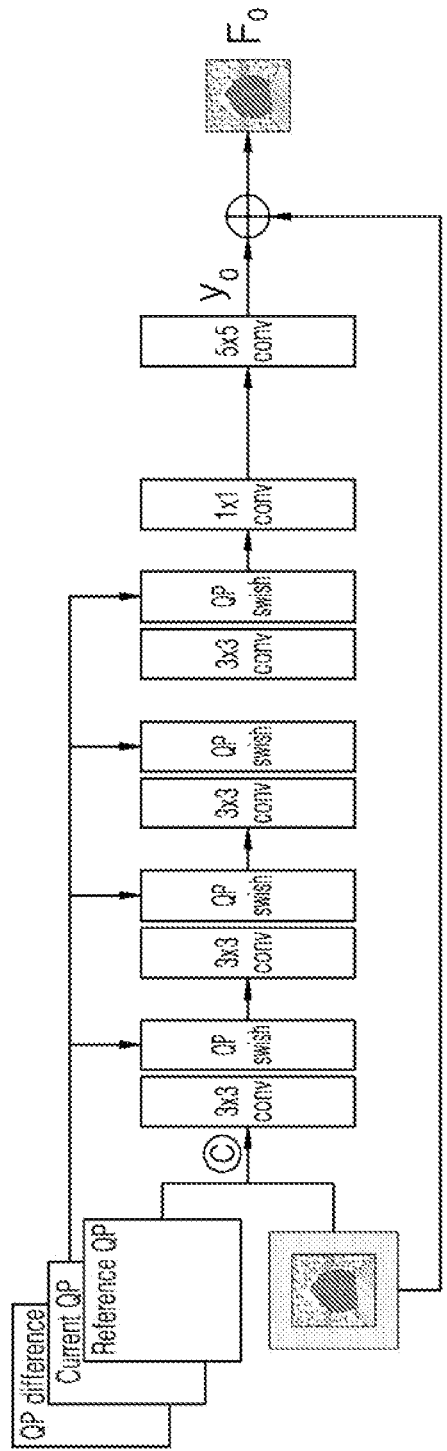
FIG. 10B is a schematic structure diagram of a deep neural network for an inter-frame prediction decoder in an example according to an embodiment of the present disclosure.

In an embodiment, at the decoding-end, the AI interpolation filter includes at least one convolution unit, and the at least one convolution unit includes at least one convolution layer and at least one nonlinear activation layer, wherein the at least one nonlinear activation layer processes, based on the distortion aware information of the current decoding unit, the convolution result output by the cascaded convolution layer. In an embodiment, the at least one nonlinear activation layer processes, by using activation parameters determined based on the distortion aware information of the current decoding unit, the convolution result output by the cascaded convolution layer. For example, as shown in FIG. 10B, the first five CNN layers (illustrated as conv1 to conv5) are feature extraction layers, wherein the first CNN layer has total 16 convolution kernels, each of which is 3; the second CNN layer has total 64 convolution kernels, each of which is 3; the third CNN layer has total 64 convolution kernels, each of which is 3; the fourth CNN layer has total 64 convolution kernels, each of which is 3; and, the fifth CNN layer has total 32 convolution kernels, each of which is 1. The nonlinear activation functions for the first four CNN layers are all Swish functions for adaptive adjustment based on the current block quantitation matrix (illustrated as Current QP), the reference block quantization matrix (illustrated as Reference QP) and the reference quantization matrix (illustrated as QP difference). The last CNN layer (conv6) is designed as a prediction layer, which outputs the prediction value ($F_O$) of the sub-pixel position corresponding to the motion vector precision information obtained from the code stream, where the CNN layer has total 15 convolution kernels, each of which is 5. The AI interpolation filter can adaptively adjust the interpolation coefficient by considering the distortion information. By using different filters for different feature contents, the problem of noise introduction is greatly reduced, and the interpolation error rate is also reduced.

In an embodiment, by using the advantages of the deep neural network in terms of image processing, the best interpolation filter for the current encoding video sequence is adaptively generated by using the deep neural network, so that the accuracy of inter-frame prediction is further improved and the coding efficiency is also improved.

An example training process of the interpolation filter based on the deep neural network is described in detail below. The training process may include the following steps.

As a first step of the training process, a first video set combined by several pieces of video containing different content characteristics is obtained, the content characteristics at least including a text characteristic and a motion characteristic.

As a second step of the training process, each piece of video in the first video set is input into a video encoder, and the encoding parameter of the video encoder is a quantization coefficient that has a value range of {27,32,38,45}. The video encoder outputs a code stream of each piece of data in the first video set under each quantization parameter to form a first code stream set.

Another possible implementation will be given below.

Tools affin, awp, dmvr, bio, interpf, ipc, bgc, and obmc in the encoder are closed; the quantization coefficient has a value range of {27,32,38,45}; and, the video encoder outputs a code stream of each piece of video in the first video set under each quantization coefficient to form a first code stream set.

As a third step of the training process, each code stream in the first code stream set is input into a video decoding-end to obtain the encoding unit information and reconstructed encoding units in each image of the coded video.

As a fourth of the training process, the position (x2,y2) of the top left sample point in the sample matrix of ¼ pixel precision and ½ pixel precision pointed by the encoding unit in the reference image is derived according to the encoding unit information; and then, the reconstructed encoding units using y2 as the sub-pixel point position or x2 as the sub-pixel point position form a first data set., The position coordinates of the encoding unit in the current image is (x1,y1), where x2=(x1<<2)±(MVDx<<AmvrIndex)+MVPx, y2=(y1<<2)+(MVDy<<AmvrIndex)+MVPy, << is a left shifting operation, and MVPx and MVPy are the x component and y component of the motion vector predicted value of the current encoding unit derived from the encoding unit information and have a basic unit of ¼ precision.

As a fifth step of the training process, the reconstructed encoding units in the first training data set are expanded according to the information of the convolution kernel in the deep neural network to obtain a second training data set.

As a sixth step of the training process, a sample matrix corresponding to each encoding unit after interpolation is derived by using a conventional interpolation filter to form a second data set.

As a seventh step of the training process, by using the second data set and the first data set, the loss cost of the conventional interpolation filter corresponding to each encoding unit according to a loss function, to form a loss cost data set.

As an eighth step of the training process, quantization matrices are generated by using the quantization parameter (or quantization step or quantization error) of each encoding unit and the quantization parameter (or quantization step or quantization error) of the reference block pointed by each encoding unit in the second training data set, so that a first quantization matrix (current encoding unit quantization matrix), a second quantization matrix (reference block quantization matrix) and a third quantization matrix (quantization matrix corresponding to the difference between the quantization parameter of the current encoding unit and the quantization parameter of the reference block) are obtained, respectively, wherein the quantization matrix has the same size as the expanded encoding unit, and the element value of each sample point position in the matrix is the same and equal to the quantization parameter (or quantization step or quantization error).

According to an example of a possible implementation, quantization matrices are generated by using the quantization parameter (or quantization step or quantization error) of each encoding unit and the quantization parameter (or quantization step or quantization error) of the reference block pointed by each encoding unit in the second training data set, so that a first quantization matrix (current encoding unit quantization matrix) and a second quantization matrix (reference block quantization matrix) are obtained, respectively.

According to another example of a possible implementation, quantization matrices are generated by using the quantization parameter (or quantization step or quantization error) of the reference block pointed by each encoding unit in the second training data set, so that a first quantization matrix (e.g., a reference block quantization matrix) is obtained.

As a ninth step of the training process, the second training data set, the first quantization matrix, the second quantization matrix, and the third quantization matrix are input into a deep neural network, and a first deep neural network is trained by using the encoding units in the first video set corresponding to the reconstructed encoding units in the first training data set as the target of training the deep neural network. Each output layer of the last layer of the CNN network is a layer corresponding to the smallest loss cost. When the numerical value of the loss cost of the layer is smaller than the corresponding loss cost of the conventional interpolation filter, this layer and other CNN layers in the network are updated.

According to an example of a possible implementation, the second training data set, the first quantization matrix and the second quantization matrix are input into a deep neural network, and a first deep neural network is trained by using the encoding units in the first video set corresponding to the reconstructed encoding units in the first training data set as the target of training the deep neural network.

According to another example of a possible implementation, the second training data set and the second quantization matrix are input into a deep neural network, and a first deep neural network is trained by using the encoding units in the first video set corresponding to the reconstructed encoding units in the first training data set as the target of training the deep neural network.

According to an example of a possible implementation, the second training data set is input into a deep neural network, and a first deep neural network is trained by using the encoding units in the first video set corresponding to the reconstructed encoding units in the first training data set as the target of training the deep neural network.

As a tenth step of the training process, the second training data set, the first quantization matrix, the second quantization matrix, and the third quantization matrix are input into the trained deep neural network, a corresponding layer with the smallest loss cost in the output layer is calculated, and the frequency of occurrence of the smallest layer corresponding to each sub-pixel position is counted, and the correspondence between 15 sub-pixel positions and 15 sub-layers in the output layer is matched according to the frequency of occurrence and denoted by index=ayers [xFrac*4+yFrac−1], where the index is the position of the output layer of the neural network, layers is the correspondence between sub-pixel positions and the position of the output layer of the neural network, and xFrac and yFrac are sub-pixel point position, where xFrac=x2 & 3, and yFrac=y2 & 3.

According to an example of a possible implementation, the second training data set, the first quantization matrix and the second quantization matrix are input into a deep neural network.

According to another example of a possible implementation, the second training data set and the second quantization matrix are input into a deep neural network.

According to yet another example of a possible implementation, the second training data set is input into a deep neural network.

The loss function is defined in such a way: the interpolated encoding unit output by each iteration of the neural network has the same size as the corresponding encoding unit in the first video set as the target, and the sum of absolute difference (SAD) of each position element in the two encoding units is used as the loss function.

An embodiment of the present disclosure may include an electronic device, including a transceiver, a memory, a processor, and a computer program stored on the memory. The processor executes the computer program to implement the steps performed by the first node.

Figure 11:
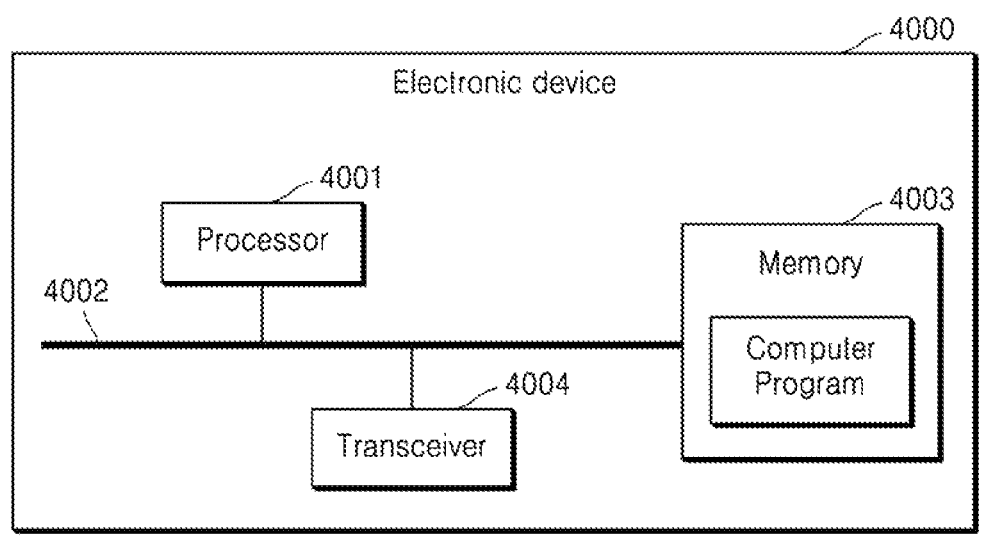
FIG. 11 is a schematic structure diagram of an electronic device according to an embodiment of the present disclosure.

In an embodiment, an electronic device is provided, as shown in FIG. 11, wherein the electronic device 4000 includes a processor 4001 and a memory 4003. In an embodiment, the processor 4001 communicates with the memory 4003, e.g., via a bus 4002. In an embodiment, the electronic device 4000 may also include a transceiver 4004, which may be used for data interaction between the electronic device 4000 and other electronic devices, such as data transmission and/or data reception. Embodiments are not limited to the structure of the electronic device 4000 illustrated in FIG. 11. For example, although only one transceiver 4004 is illustrated in FIG. 11, according to an embodiment the electronic device 4000 may include multiple transceivers 4004, or may not include a transceiver 4004, and may include one or more other elements for interaction between the electronic device 4004 and other electronic devices.

The processor 4001 may be a central processing unit (CPU), a general-purpose processor, a digital signal processor (DSP), an application specific integrated circuit (ASIC), and a field programmable gate array (FPGA), or other programmable logic devices, transistor logic device, hardware component, or any combination thereof. It is possible to implement or execute the various exemplary logical blocks, modules, and circuits described in combination with the disclosures of the present disclosure. The processor 4001 may also be a combination of computing functions, such as a combination of one or more microprocessors, a combination of a DSP and a microprocessor, and so on.

The bus 4002 may include a path for delivering information among the above components. The bus 4002 may be a peripheral component interconnect (PCI) bus or an extended industry standard architecture (EISA) bus. The bus 4002 may be divided into an address bus, a data bus, a control bus, and so on. For ease of illustration, only one bold line is shown in FIG. 11, but does not indicate that there is only one bus or type of bus.

The memory 4003 may be a read-only memory (ROM) or other types of static storage devices that can store static information and instructions, a random-access memory (RAM) or other types of storage devices that can store information and instructions. The memory 4003 may also be electrically erasable programmable read-only memory (EEPROM), compact disc read-only memory (CD-ROM), or other optical disk storage, optical disk storage (including compressed compact disc, laser disc, compact disc, digital versatile disc, blue-ray disc, etc.), magnetic disk storage medium or other magnetic storage devices, or any other medium capable of carrying or storing computer programs and capable of being accessed by a computer, but not limited to this.

The memory 4003 may be used to store computer programs for executing an embodiment of the present disclosure and is controlled for execution by the processor 4001. The processor 4001 is used to execute the computer program stored in memory 4003 to implement the steps shown in the preceding method embodiment.

An embodiment of the present disclosure may provide a computer-readable storage medium having a computer program stored on the computer-readable storage medium, the computer program, when executed by a processor, implements the steps and corresponding contents of the foregoing method embodiments.

An embodiment of the present disclosure may also provide a computer program product including a computer program, the computer program when executed by a processor realizing the steps and corresponding contents of the preceding method embodiments.

It will be understood by those skilled in the art that, unless specifically stated, the singular forms "one", "a", "said" and "the" as used herein may also include the plural form. The terms "include" and "comprise" as used in the embodiments of the present disclosure mean that the corresponding features may be implemented as the features, information, data, steps, operations presented, but do not exclude the implementation of other features, information, data, steps, operations, etc. supported in the art.

The terms "first", "second", "third", "fourth", "1", "2", etc., in the specification and claims of the present disclosure and the accompanying drawings above, if present, are configured to distinguish similar objects and need not be configured to describe a particular order or sequence. It should be understood that the data so used may be interchangeable where appropriate so that embodiments of the present disclosure described herein may be implemented in an order other than that illustrated or described in the text.

It should be understood that although the flow diagrams of embodiment of the present disclosure indicate the individual operational steps by means of arrows, the order in which these steps are carried out is not limited to the order indicated by the arrows. Unless explicitly stated herein, in some implementation scenarios of embodiments of the present disclosure, the implementation steps in the respective flowcharts may be performed in other orders as desired. In addition, some or all of the steps in each flowchart may include multiple sub-steps or multiple stages based on the actual implementation scenario. Some or all of these sub-steps or phases may be executed at the same moment, and each of these sub-steps or phases may also be executed separately at different moments. The execution order of these sub-steps or stages may be flexibly configured according to requirements in scenarios where the execution time is different, and this is not limited by the embodiments of the present disclosure.

It should be noted that for a person of ordinary skill in the art, other similar means of implementation based on the technical ideas of the present disclosure, without departing from the technical concept of the present disclosure, also fall within the scope of protection of the embodiments of the present disclosure.

What is claimed is:

1. A video encoding method, comprising:
    based on first distortion aware information about a current encoding unit and second distortion aware information about a corresponding reference encoding unit, determining a first predicted value of the current encoding unit using at least one interpolation filter, wherein the at least one type of interpolation filter comprises an artificial intelligence (AI) interpolation filter; and
    encoding the current encoding unit based on the first predicted value of the current encoding unit.

2. The method according to claim 1, wherein the first distortion aware information-comprises at least one of a quantization parameter of the current encoding unit and a quantization parameter difference between the current encoding unit and the corresponding reference encoding unit, and
    wherein the second distortion aware information comprises at least one of a quantization parameter of the corresponding reference encoding unit, and the quantization parameter difference.

3. The method according to claim 2, wherein the quantization parameter of the current encoding unit is determined based on the quantization parameter of the corresponding reference encoding unit and the quantization parameter difference, and
    wherein the quantization parameter of the corresponding reference encoding unit is determined based on the quantization parameter of the current encoding unit and the quantization parameter difference.

4. The method according to claim 1, wherein the AI interpolation filter comprises at least one convolution unit,
    wherein the at least one convolution unit comprises at least one convolution layer and at least one nonlinear activation layer, and
    wherein the at least one nonlinear activation layer is configured to, based on the first distortion aware information, process a convolution result output by a cascaded convolution layer.

5. The method according to claim 4, wherein the at least one nonlinear activation layer is configured to process the convolution result output by the cascaded convolution layer based on an activation parameter determined based on the first distortion aware information.

6. The method according to claim 1, wherein, based on at least two types of interpolation filters being used to determine the first predicted value of the current encoding unit, the method further comprises:
    writing identification information which indicates an interpolation filter corresponding to the first predicted value into a code stream.

7. The method according to claim 6, wherein the writing the identification information comprises:
    writing the identification information into the code stream using a predetermined coding unit (CU)-level flag bit.

8. The method according to claim 1, wherein the determining the first predicted value of the current encoding unit comprises:
    based on the first distortion aware information and the second distortion aware information, determining a second predicted value corresponding to each sub-pixel position of the current encoding unit using the at least one type of interpolation filter; and
    determining the first predicted value of the current encoding unit based on the second predicted value.

9. The method according to claim 8, wherein the determining the second predicted value comprises:
    obtaining a motion vector (MV) corresponding to an integer-pixel position of the current encoding unit; and
    determining, based on a reference encoding unit corresponding to the MV, the second predicted value using the at least one type of interpolation filter.

10. The method according to claim 9, wherein the determining the second predicted value of the current encoding unit further comprises:
    based on at least one of a quantization parameter of the current encoding unit, a quantization parameter of the corresponding reference encoding unit, or a quantization parameter difference between the current encoding unit and the corresponding reference encoding unit, obtaining the second predicted value using the AI interpolation filter.

11. The method according to claim 10, wherein the obtaining the second predicted value using the AI interpolation filter comprises:
    expanding the reference encoding unit to a predetermined size to obtain a corresponding input matrix;

inputting, into at least one cascaded convolution unit of the AI interpolation filter, the input matrix and at least one of: the quantization parameter of the current encoding unit, the quantization parameter of the corresponding reference encoding unit, and the quantization parameter difference;

performing a convolution operation using a convolution layer of the convolution unit; and processing the convolution result of the convolution layer using a nonlinear activation layer of the convolution unit to obtain a corresponding second predicted value which corresponds to a sub-pixel position of the current encoding unit.

12. The method according to claim 8, wherein the determining the first predicted value of the current encoding unit further comprises:

obtaining a rate distortion cost based on each second predicted value; and determining the first predicted value of the current encoding unit based on each rate distortion cost.

13. A video decoding method, comprising:

based on received code stream, determining a reference decoding unit corresponding to a current decoding unit;

based on first distortion aware information about the current decoding unit and second distortion aware information about the corresponding reference decoding unit, determining a predicted value of the current decoding unit using at least one interpolation filter, wherein the at least one type of interpolation filter comprises an artificial intelligence (AI) interpolation filter; and decoding the current decoding unit based on the first predicted value of the current decoding unit.

14. The method according to claim 13, further comprising:

obtaining, from the code stream, identification information which indicates an interpolation filter corresponding to the current decoding unit; and based on the identification information, determining to use the AI interpolation filter to decode the current decoding unit.

15. The method according to claim 13, wherein the first distortion aware information comprises at least one of: a quantization parameter of the current decoding unit, and a quantization parameter difference between the current decoding unit and the corresponding reference decoding unit, and wherein the second distortion aware information comprises at least one of: a quantization parameter of the reference decoding unit, and the quantization parameter difference.

16. The method according to claim 15, wherein the quantization parameter of the current decoding unit is determined based on the quantization parameter of the reference decoding unit and the quantization parameter difference, and wherein the quantization parameter of the reference decoding unit is determined based on the quantization parameter of the current decoding unit and the quantization parameter difference.

17. The method according to claim 13, wherein the AI interpolation filter comprises at least one convolution unit, wherein the at least one convolution unit comprises at least one convolution layer and at least one nonlinear activation layer and wherein the at least one nonlinear activation layer is configured to process a convolution result output by a cascaded convolution layer based on first the distortion aware information of the current decoding unit.

18. The method according to claim 17, wherein the at least one nonlinear activation layer is configured to, using an activation parameter determined based on the distortion aware information of the current decoding unit, process the convolution result output by the cascaded convolution layer.

19. The method according to claim 13, wherein the video decoding method further comprises:

obtaining motion vector precision information from the code stream, wherein the predicted value of the current decoding unit is determined using the motion vector precision information and the at least one interpolation filter based on the first distortion aware information and the second distortion aware information.

20. An encoding device, comprising:

a memory configured to store instructions; and a processor configured to execute the instructions to:

based on first distortion aware information about a current encoding unit and second distortion aware information about a corresponding reference encoding unit, determine a first predicted value of the current encoding unit using at least one interpolation filter, wherein the at least one type of interpolation filter comprises an artificial intelligence (AI) interpolation filter; and encode the current encoding unit based on the first predicted value of the current encoding unit.

* * * * *